(12) United States Patent
Smothers et al.

(10) Patent No.: US 10,629,069 B2
(45) Date of Patent: Apr. 21, 2020

(54) METHOD AND APPARATUS FOR PROVIDING A LOCALIZED LINK-CENTRIC METRIC FOR DIRECTIONAL TRAFFIC PROPAGATION

(71) Applicant: HERE GLOBAL B.V., Eindhoven (NL)

(72) Inventors: Evan Smothers, San Francisco, CA (US); Antonio Haro, Walnut Creek, CA (US); Andrew Lewis, Berkeley, CA (US); Davide Pietrobon, Berkeley, CA (US)

(73) Assignee: HERE Global B.V., Eindhoven (NL)

( * ) Notice: Subject to any disclaimer, the term of this patent is extended or adjusted under 35 U.S.C. 154(b) by 80 days.

(21) Appl. No.: 15/842,433

(22) Filed: Dec. 14, 2017

(65) Prior Publication Data

US 2019/0189001 A1    Jun. 20, 2019

(51) Int. Cl.
| | |
|---|---|
| *G08G 1/08* | (2006.01) |
| *G08G 1/01* | (2006.01) |
| *G08G 1/0967* | (2006.01) |
| *G01C 21/34* | (2006.01) |
| *G08G 1/0968* | (2006.01) |

(Continued)

(52) U.S. Cl.
CPC ........... *G08G 1/0104* (2013.01); *G01C 21/34* (2013.01); *G08G 1/0112* (2013.01);
(Continued)

(58) Field of Classification Search
CPC .... G08G 1/08; G08G 1/0104; G08G 1/09675; G08G 1/096775
(Continued)

(56) References Cited

U.S. PATENT DOCUMENTS

| 7,536,254 B2 | 5/2009 | Kumagai et al. |
| 7,898,433 B2 * | 3/2011 | Roberts ............... G08G 1/0104 340/907 |

(Continued)

FOREIGN PATENT DOCUMENTS

JP    2008181397 A    8/2008

OTHER PUBLICATIONS

Fabritiis et al., "Traffic Estimation and Prediction Based on Real Time Floating Car Data", Proceedings of the 11th International IEEE Conference on Intelligent Transportation Systems, Oct. 12-15, 2008, pp. 197-203.

(Continued)

*Primary Examiner* — Tan Q Nguyen
(74) *Attorney, Agent, or Firm* — Ditthavong & Steiner, P.C.

(57) ABSTRACT

An approach is provided for a localized link-centric metric for directional traffic propagation. The approach, for instance, involves designating a base link of the road network. The approach also involves determining a plurality of vehicle trajectories that pass through the base link. The plurality of vehicle trajectories is based on probe data collected from one or more sensors of a plurality of vehicles travelling in the road network. The approach further involves determining a frequency at which the plurality of vehicle trajectories passes through the base link to each of one or more other links in the plurality of vehicle trajectories within a proximity threshold. The approach further involves computing a link-centric metric for said each of the one or more other links relative to the base link based on the determined frequency.

20 Claims, 15 Drawing Sheets

(51) Int. Cl.
*G08G 1/0969* (2006.01)
*G06F 19/00* (2018.01)

(52) U.S. Cl.
CPC ......... *G08G 1/0133* (2013.01); *G08G 1/0141* (2013.01); *G08G 1/08* (2013.01); *G08G 1/0969* (2013.01); *G08G 1/09675* (2013.01); *G08G 1/096716* (2013.01); *G08G 1/096741* (2013.01); *G08G 1/096827* (2013.01); *G08G 1/096844* (2013.01); *G08G 1/096775* (2013.01)

(58) Field of Classification Search
USPC ......................................................... 701/117
See application file for complete search history.

(56) References Cited

U.S. PATENT DOCUMENTS

| | | | |
|---|---|---|---|
| 7,925,425 B2 * | 4/2011 | Tomita | G01C 21/3691 340/995.13 |
| 8,606,727 B2 | 12/2013 | Wu et al. | |
| 8,798,897 B2 * | 8/2014 | Fei | G08G 1/0116 701/118 |
| 2007/0177518 A1 * | 8/2007 | Li | H04L 43/50 370/252 |
| 2012/0115475 A1 * | 5/2012 | Miyake | G06Q 10/06 455/435.1 |
| 2014/0149029 A1 * | 5/2014 | Sakakibara | G08G 1/0116 701/118 |

OTHER PUBLICATIONS

Zhang et al., "Urban Link Travel Time Prediction Based on a Gradient Boosting Method Considering Spatiotemporal Correlations", ISPRS International Journal of Geo-Information, Article, vol. 5, No. 11, Nov. 4, 2016, 24 Pages.

Ermagun et al., "Using Temporal Detrending to Observe the Spatial Correlation of Traffic", Research Article, May 4, 2017, 21 Pages.

Wang et al., "Visual Exploration of Sparse Traffic Trajectory Data", IEEE Transactions on Visualization and Computer Graphics, vol. 20, No. 12, Dec. 2014, pp. 1813-1822.

* cited by examiner

METHOD AND APPARATUS FOR PROVIDING A LOCALIZED LINK-CENTRIC METRIC FOR DIRECTIONAL TRAFFIC PROPAGATION

BACKGROUND

Mapping-related service providers (e.g., map data providers, navigation service providers, etc.) face significant technical challenges when modeling traffic. For example, it can be difficult to determine what road segments or links are affected by disturbances in traffic flow (e.g., an accident, construction, etc.) and how that traffic disturbance propagates to other road segments or links in the road network. Accordingly, service providers are challenged to develop metrics for efficiently modeling how traffic propagates among road segments or links of a road network.

SOME EXAMPLE EMBODIMENTS

Therefore, there is a need for an approach for providing a localized link-centric metric for directional traffic propagation (e.g., inflowing or outflowing traffic from road link).

According to one embodiment, a computer-implemented method for providing a link-centric metric for traffic in a road network comprises designating a base link of the road network. The method also comprises retrieving a plurality of vehicle trajectories that pass through the base link. The plurality of vehicle trajectories, for instance, is based on probe data collected from one or more sensors of a plurality of vehicles travelling in the road network. The method further comprises determining a frequency at which the plurality of vehicle trajectories passes through the base link to each of one or more other links in the plurality of vehicle trajectories within a proximity threshold. The method further comprises computing a link-centric metric for said each of the one or more other links relative to the base link based on the determined frequency.

According to another embodiment, an apparatus for providing a link-centric metric for traffic in a road network comprises at least one processor, and at least one memory including computer program code for one or more computer programs, the at least one memory and the computer program code configured to, with the at least one processor, cause the apparatus to designate a base link of the road network. The apparatus is also caused to retrieve a plurality of vehicle trajectories that pass through the base link. The plurality of vehicle trajectories, for instance, is based on probe data collected from one or more sensors of a plurality of vehicles travelling in the road network. The apparatus is further caused to determine a frequency at which the plurality of vehicle trajectories passes through the base link to each of one or more other links in the plurality of vehicle trajectories within a proximity threshold. The apparatus is further caused to compute a link-centric metric for said each of the one or more other links relative to the base link based on the determined frequency.

According to another embodiment, a computer-readable storage medium for providing a link-centric metric for traffic in a road network carries one or more sequences of one or more instructions which, when executed by one or more processors, cause, at least in part, an apparatus to designate a base link of the road network. The apparatus is also caused to retrieve a plurality of vehicle trajectories that pass through the base link. The plurality of vehicle trajectories, for instance, is based on probe data collected from one or more sensors of a plurality of vehicles travelling in the road network. The apparatus is further caused to determine a frequency at which the plurality of vehicle trajectories passes through the base link to each of one or more other links in the plurality of vehicle trajectories within a proximity threshold. The apparatus is further caused to compute a link-centric metric for said each of the one or more other links relative to the base link based on the determined frequency.

According to another embodiment, an apparatus for providing a link-centric metric for traffic in a road network comprises means for designating a base link of the road network. The apparatus also comprises means for retrieving a plurality of vehicle trajectories that pass through the base link. The plurality of vehicle trajectories, for instance, is based on probe data collected from one or more sensors of a plurality of vehicles travelling in the road network. The apparatus further comprises means for determining a frequency at which the plurality of vehicle trajectories passes through the base link to each of one or more other links in the plurality of vehicle trajectories within a proximity threshold. The apparatus further comprises means for computing a link-centric metric for said each of the one or more other links relative to the base link based on the determined frequency.

According to another embodiment, a computer-implemented method for providing a link-centric metric for traffic in a road network comprises compressing a plurality of vehicle trajectories into a plurality of token sequences. Each token of each of the plurality of token sequences, for instance, represents a link of the road network. The method also comprises designating a base link of the road network from among in the plurality of token sequences. The method further comprises computing a link-centric metric for one or more links represented in the plurality of token sequences relative to the base link based on a frequency at which the plurality of token sequences indicates that the plurality of vehicle trajectories passes through the base link to the one or more links.

According to another embodiment, an apparatus for providing a link-centric metric for traffic in a road network comprises at least one processor, and at least one memory including computer program code for one or more computer programs, the at least one memory and the computer program code configured to, with the at least one processor, cause the apparatus to compress a plurality of vehicle trajectories into a plurality of token sequences. Each token of each of the plurality of token sequences, for instance, represents a link of the road network. The apparatus is also caused to designate a base link of the road network from among in the plurality of token sequences. The apparatus is further caused to compute a link-centric metric for one or more links represented in the plurality of token sequences relative to the base link based on a frequency at which the plurality of token sequences indicates that the plurality of vehicle trajectories passes through the base link to the one or more links.

According to another embodiment, a computer-readable storage medium for providing a link-centric metric for traffic in a road network carries one or more sequences of one or more instructions which, when executed by one or more processors, cause, at least in part, an apparatus to compress a plurality of vehicle trajectories into a plurality of token sequences. Each token of each of the plurality of token sequences, for instance, represents a link of the road network. The apparatus is also caused to designate a base link of the road network from among in the plurality of token sequences. The apparatus is further caused to compute a link-centric metric for one or more links represented in the plurality of token sequences relative to the base link based on a frequency at which the plurality of token sequences indicates that the plurality of vehicle trajectories passes through the base link to the one or more links.

According to another embodiment, an apparatus for providing a link-centric metric for traffic in a road network comprises means for compressing a plurality of vehicle trajectories into a plurality of token sequences. Each token of each of the plurality of token sequences, for instance, represents a link of the road network. The apparatus also comprises means for designating a base link of the road network from among in the plurality of token sequences. The apparatus further comprises means for computing a link-centric metric for one or more links represented in the plurality of token sequences relative to the base link based on a frequency at which the plurality of token sequences indicates that the plurality of vehicle trajectories passes through the base link to the one or more links.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a localized link-centric metric for directional traffic propagation are disclosed. In the following description, for the purposes of explanation, numerous specific details are set forth in order to provide a thorough understanding of the embodiments. It is apparent, however, to one skilled in the art that the embodiments may be practiced without these specific details or with an equivalent arrangement. In other instances, well-known structures and devices are shown in block diagram form in order to avoid unnecessarily obscuring the embodiments.

Figure 1:
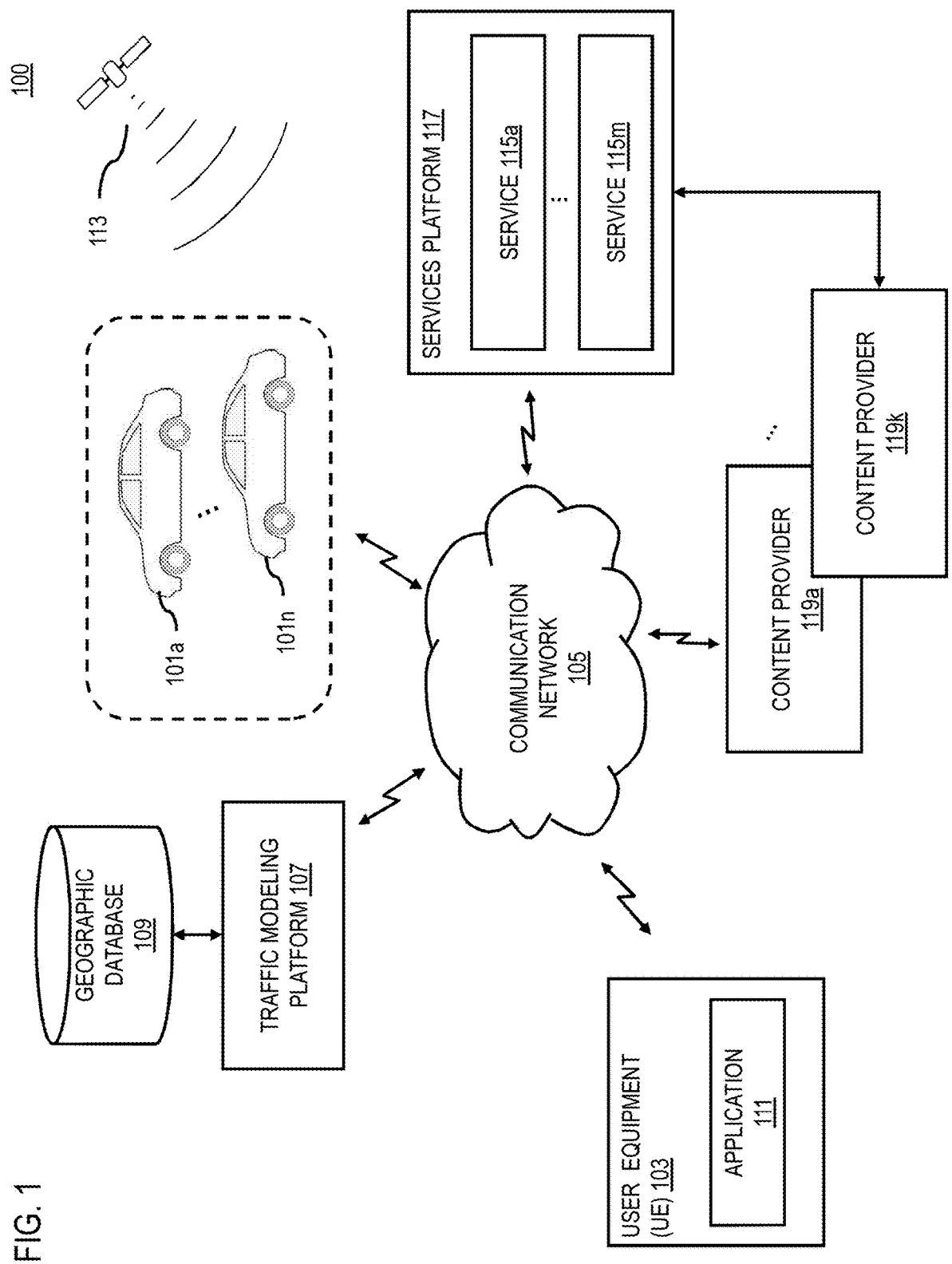
FIG. 1 is a diagram of a system capable of providing a localized link-centric metric for directional traffic propagation, according to one embodiment.

FIG. 1 is a diagram of a system capable of providing a localized link-centric metric for directional traffic propagation, according to one embodiment. Understanding traffic flow in a transportation or road network (e.g., an urban grid of road segments) is very important for real-time predictive traffic modeling. For example, given information about a disturbance in traffic flow (e.g. an accident, construction, a parade, etc.) at a particular location or link in a road network, one would hope to determine the nearby road segments or links that will be most affected by the disturbance. However, determining which the propagation of the traffic disturbance from one link to other links present technical challenges, particularly when minimizing data requirements. Information on the propagation of the traffic disturbance can then be used to for any number of applications or use cases (e.g., adjusting routing and estimated time of arrival (ETA) calculations, adjusting signs or traffic signal timing, etc.). The difficulty of the technical challenge can depend on the type of road links on which the disturbance occurs. For example, on a highway, the most affected links may be those that are upstream of said disturbance. However, on an urban grid, it may be impossible to discern a natural ordering based merely on the geometry of the road because of multiple possible pathways through the epicenter of a disturbance. Therefore, service providers face significant technical challenges to determining and considering the paths taken by vehicles passing through the epicenter of the disturbance.

In real-time traffic flow modeling, another problem is that of sparse data. It is often the case that a link has no probe data over several sampling units. However, the penetration rate is such that a lack of probe data is not sufficient to indicate free flow on a given link. Many real-time applications dealing with sparse data simply use the average speed profile over that link in the past. However, this can lead to large errors in both speed estimates and ETA calculations. A more reasonable approach would be to also accept data from nearby links. However, as with the disturbance propagation problem described above, determining which nearby links to use for filling in the sparse probe data presents significant technical challenges.

To address at least these problems, a system 100 of FIG. 1 introduces a capability to provide a local model for traffic flow through a given link or location (e.g., a designated base link). For example, the system 100 provides a capability to determine a correlation of links relative to some base location, road segment, or link with respect to the overall flow of traffic. In one embodiment, the correlation can be directional by, for instance, separately considering the inflow and outflow traffic with respect to the base link. The various embodiments of the approach described herein are based solely on vehicle trajectory data and are independent of road geometry. In other words, the system 100 determines which links are strongly correlated with one another with no a priori knowledge of the surrounding road network (making the system 100 especially well-suited for applications to urban traffic flow).

Is noted that although the various embodiments described herein are discussed with respect to vehicle trajectories and links or a road network, it is contemplated that the embodiments described for providing a link-centric metric is applicable to any type of trajectory that, for instance, can be sensed by one or more sensors of a probe device. The probe device, in this case, is not necessarily a vehicle traversing a road network, but can be any type of device that can monitor a process that has an observable feature or characteristic that can be sensed and evolve over time to create a probe trajectory. Therefore, in a general case of a probe trajectory, instead of matching or segmenting the trajectory to a respective a road link, the system can segment the general probe trajectory into any number of trajectory segments with each segment representing a system-defined feature to which the segments can be matched. Accordingly, any description of a link-centric metric can be applied to determine a feature-centric or segment-centric metric in general.

In one embodiment, the system 100 provides a metric (i.e., a link-centric metric) to represent the correlation of the links to some base link. The link-centric metric, for instance, describes the frequency with which vehicle trajectories passing through the base link also visit each other link, adjusted to account for proximity within individual trajectories. As noted above, to provide for a directional metric, the metric can be split so that inflow and outflow from the base link are considered separately. In one embodiment, by computing or determining this link-centric metric, it is possible to predict which links near a selected base link have traffic propagation most closely associated with the base link. In this way, the system 100 can also predict which links will be most strongly affected by an initial traffic disturbance at the selected base link, as well as determine which links should be considered when performing gap-filling for sparse probe data and the order of importance of nearby links for gap-filling. Therefore, use cases for the link-centric metric include, but are not limited to:

Gap-filling methods for traffic models (real-time traffic and historical traffic patterns);
Real-time routing and time of arrival estimates;
Link correlation as a function of vehicle paths; and
Real-time traffic disturbance propagation.

In one embodiment, analysis of traffic from probe data is using a link-based approach. Namely, collected probe data can be map-matched to the nearest road segment (link), with which that reading is then identified. In this fashion, routing procedures, time of arrival estimates, and analysis of traffic patterns can all be cast as link-level problems. This link-based framework also allows for the reconstruction of anonymized vehicle trajectories. For example, in one embodiment, an individual vehicle trajectory may be represented as a sequence of links instead of the raw probe points of the probe data comprising the vehicle trajectory. In one embodiment, the system 100 can further pre-process the link sequence for additional compression by ensuring that the link sequence has no two consecutive links that are the same. It is noted however, that a link is an example of a geographic data representation for indicating a location or segment of a road network, it is contemplated that any other representation of a location, road segment, area, or portion thereof (e.g., partial links or road segments) can be used equivalently according to the various embodiments described herein.

In one embodiment, links can be tokenized, and trajectories may be represented as a sequence of tokens. For example, a token can be any abstract representation of the a link including, but not limited to, a sequence of characters (e.g., "aaa", "Aaa", etc.). The original link information (e.g., link identifier, link attributes, etc.) may be obtained from the tokens via a lookup table. Tokenization of links has several advantages. First, it leads to a significant rate of data compression relative to the output of the traditional internally-implemented trajectory reconstruction code. Second, it provides more readable link identification, and links may be more easily selected without knowledge of specific link identifiers (ID's). Third, trajectories may then be constructed as a concatenation of link tokens, rather than a sequence of rows of link ID's in a .csv file or equivalent. In this regime, links, trajectories, nodes, and/or any other representation of a geographic location/segment/area/etc. may all be represented and related via an object-oriented approach (e.g., via tokenized objects).

A large portion of traffic modeling is dependent on the understanding of traffic as "flow" (analogous to that of a fluid), and understanding the macroscopic flow of traffic can be important in predictive modeling. Macroscopic traffic flow on highways is relatively well-understood: on and off-ramps provide the only sources and sinks, and apart from these the overall density of vehicles on a stretch of highway is generally conserved. In an urban setting, streets often follow a grid-like pattern, and as a result classifying directional flow of vehicles can prove much more difficult.

Returning to FIG. 1, in one embodiment, the system 100 comprises one or more vehicles 101a-101n (also collectively referred to as vehicles 101) and/or one or more user equipment devices (UEs) 103 that act as probes traveling over a road network. Although the vehicles 101 are depicted as automobiles, it is contemplated that the vehicles 101 can be any type of transportation vehicle manned or unmanned (e.g., planes, aerial drone vehicles, motor cycles, boats, bicycles, etc.), and the UEs 103 can be associated with any of the types of vehicles or a person or thing traveling within the bounded geographic area (e.g., a pedestrian). In one embodiment, each vehicle 101 and/or UE 103 is assigned a unique probe identifier (probe ID) for use in reporting or transmitting probe data collected by the vehicles 101 and UEs 103. The vehicles 101 and UEs 103, for instance, are part of a probe-based system for collecting probe data for measuring traffic conditions in a road network. In one embodiment, each vehicle 101 and/or UE 103 is configured to report probe data as probe points, which are individual data records collected at a point in time that records telemetry data for that point in time.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 101 may include sensors for reporting measuring and/or reporting attributes. The attributes can also be any attribute normally collected by an on-board diagnostic (OBD) system of the vehicle, and available through an interface to the OBD system (e.g., OBD II interface or other similar interface).

The probe points can be reported from the vehicles 101 and/or UEs 103 in real-time, in batches, continuously, or at any other frequency requested by the system 100 over, for instance, the communication network 105 for processing by a traffic modeling platform 107. The probe points also can be mapped to specific road links, road segments, nodes, and/or any other type of geographic representation (e.g., surface facet of a high resolution surface mesh representing a geographic area) stored in the geographic database 109. In one embodiment, the system 100 (e.g., via the traffic modeling platform 107) can generate probe traces (e.g., vehicle trajectories, vehicle paths, etc.) from the probe points for an individual probe so that the probe traces represent a travel trajectory of the probe through the road network. The vehicle trajectories can then be used to determine the link-centric metric according to the various embodiments described herein.

In one embodiment, the travel-speed data can be provided by one or more speed sensors operating in the road network. For example, the road network may be equipped with sensors including, but not limited to, fixed inductive loop sensors, cameras, radar, and/or other remoting sensing devices capable of determining travel speeds of vehicles, devices, etc. traveling in the road network. In one embodiment, the sensors can be part of a road monitoring infrastructure that reports travel-speed and other telemetry data (e.g., location, heading, vehicle type, vehicle ID, etc.) to the traffic modeling platform 107 or other monitoring center, in real-time, continuously, in batches, on demand, according to a schedule, etc.

In one embodiment, the traffic modeling platform 107 performs the processes for providing a localized link for direction traffic propagation as discussed with respect to the various embodiments described herein. In one embodiment, the traffic modeling platform 107 can be a standalone server or a component of another device with connectivity to the communication network 105. For example, the component can be part of an edge computing network where remote computing devices (not shown) are installed along or within proximity of a road network to provide semantic-free traffic prediction from travel-speed data collected locally or within a local area served by the remote or edge computing device.

In one embodiment, the traffic modeling platform 107 has connectivity or access to a geographic database 109 that includes mapping data about a road network (additional description of the geographic database 109 is provided below with respect to FIG. 10). In one embodiment, the link-centric metric, tokenized vehicle trajectories, token lookup table, and/or related data can also be stored in the geographic database 109 by the traffic modeling platform 107. In addition or alternatively, the link-centric metric and/or related data can be stored by another component of the system 100 in the geographic database 109 for subsequent retrieval and processing by the traffic modeling platform 107.

In one embodiment, the vehicles 101 and/or UEs 103 may execute an application 111 to present or use the link-centric metric generated by the traffic modeling platform 107. For example, if the application 111 is a navigation application then the link-centric metric can be used to determine routing information, provide updated estimated times of arrival (ETAs), provide notifications of predicted traffic phenomena or events, provide notifications of potentially problematic areas/intersections/interchanges, and/or the like.

By way of example, the UE 103 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 103 can support any type of interface to the user (such as "wearable" circuitry, etc.). In one embodiment, the UE 103 may be associated with a vehicle 101 (e.g., cars), a component part of the vehicle 101, a mobile device (e.g., phone), and/or a combination of thereof. Similarly, the vehicle 101 may include computing components that can be perform all or a portion of the functions of the UE 103.

By way of example, the application 111 may be any type of application that is executable at the vehicle 101 and/or the UE 103, such as mapping application, location-based service applications, navigation applications, content provisioning services, camera/imaging application, media player applications, social networking applications, calendar applications, and the like. In one embodiment, the application 111 may act as a client for the traffic modeling platform 107 and perform one or more functions of the traffic modeling platform 107 alone or in combination with the platform 107.

In one embodiment, the vehicles 101 and/or the UEs 103 are configured or mounted with various sensors for generating probe data. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture obstruction for analysis and documentation purposes), an audio recorder for gathering audio data, velocity sensors mounted on steering wheels of the vehicles, switch sensors for determining whether one or more vehicle switches are engaged, and the like.

In another embodiment, the sensors of the vehicles 101 and/or UEs 103 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle may detect the relative distance of the vehicle from lane or roadways, the presence of other vehicles, pedestrians, traffic lights, potholes and any other objects, or a combination thereof. In one scenario, the sensors may detect weather data, traffic information, or a combination thereof. In one example embodiment, the vehicles 101 and/or UEs 103 may include GPS receivers to obtain geographic coordinates from satellites 113 for determining current location and time associated with the vehicle 101 and/or UE 103 for generating probe data. Further, the location can be determined by a triangulation system such as A-GPS, Cell of Origin, or other location extrapolation technologies.

The communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the traffic modeling platform 107 may be a platform with multiple interconnected components. The traffic modeling platform 107 may include multiple servers, intelligent networking devices, computing devices, components and corresponding software for providing trajectory bundles for map data analysis. In addition, it is noted that the traffic modeling platform 107 may be a separate entity of the system 100, a part of the one or more services 115a-115m (collectively referred to as services 115) of the services platform 117, or included within the UE 103 (e.g., as part of the applications 111).

The services platform 117 may include any type of service 115. By way of example, the services 115 may include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services platform 117 may interact with the traffic modeling platform 107, the UE 103, and/or the content provider 119 to provide the services 115 based on the link-centric metric.

In one embodiment, the content providers 119a-119k (collectively referred to as content providers 119) may provide content or data to the vehicles 101 and/or UEs 103, the traffic modeling platform 107, and/or the services 115. The content provided may be any type of content, such as probe data, textual content, audio content, video content, image content, etc. In one embodiment, the content providers 119 may provide content that may aid in providing a localized link for direction traffic propagation. In one embodiment, the content providers 119 may also store content associated with the vehicles 101, the UE 103, the traffic modeling platform 107, and/or the services 115. In another embodiment, the content providers 119 may manage access to a central repository of data, and offer a consistent, standard interface to data, such as a repository of probe data, link attributes, and/or other geographic information. Any known or still developing methods, techniques or processes for retrieving and/or accessing features for road links from one or more sources may be employed by the traffic modeling platform 107.

By way of example, the vehicles 101, the UEs 103, the traffic modeling platform 107, the services platform 117, and the content providers 119 communicate with each other and other components of the system 100 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
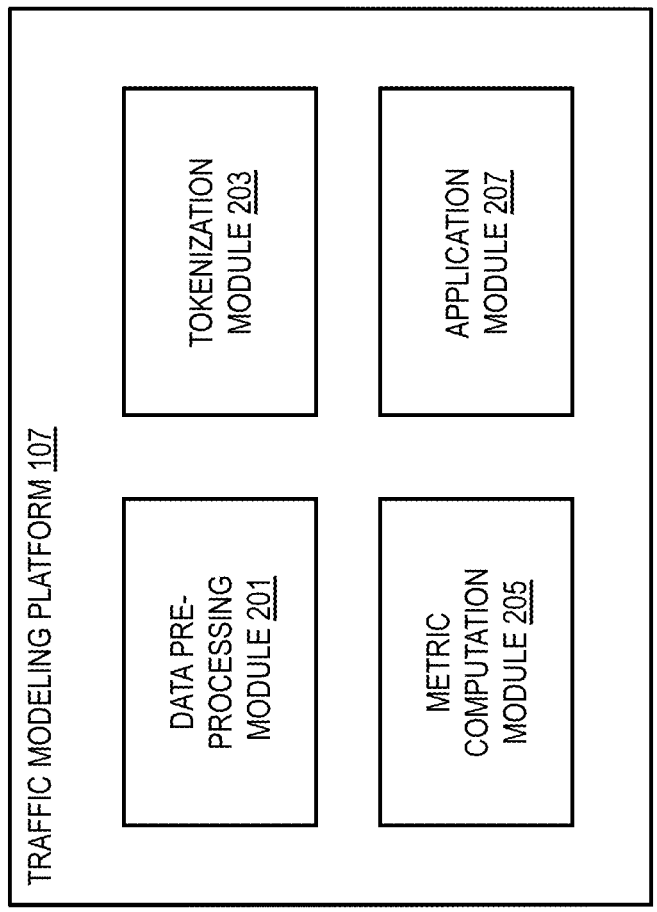
FIG. 2 is a diagram of the components of a traffic modeling platform, according to one embodiment.

FIG. 2 is a diagram of the components of a traffic modeling platform, according to one embodiment. By way of example, the traffic modeling platform 107 includes one or more components for providing semantic-free traffic prediction. It is contemplated that the functions of these components may be combined or performed by other components of equivalent functionality. In this embodiment, the traffic modeling platform 107 includes a data pre-processing module 201, a tokenization module 203, a metric computation module 205, and an application module 207. The above presented modules and components of the traffic modeling platform 107 can be implemented in hardware, firmware, software, or a combination thereof. Though depicted as a separate entity in FIG. 1, it is contemplated that the traffic modeling platform 107 may be implemented as a module of any of the components of the system 100. In another embodiment, the traffic modeling platform 107 and/or one or more of the modules 201-207 may be implemented as a cloud based service, local service, native application, or combination thereof. The functions of the traffic modeling platform 107 and the modules 201-207 are discussed with respect to FIGS. 3-10 below.

Figure 3:
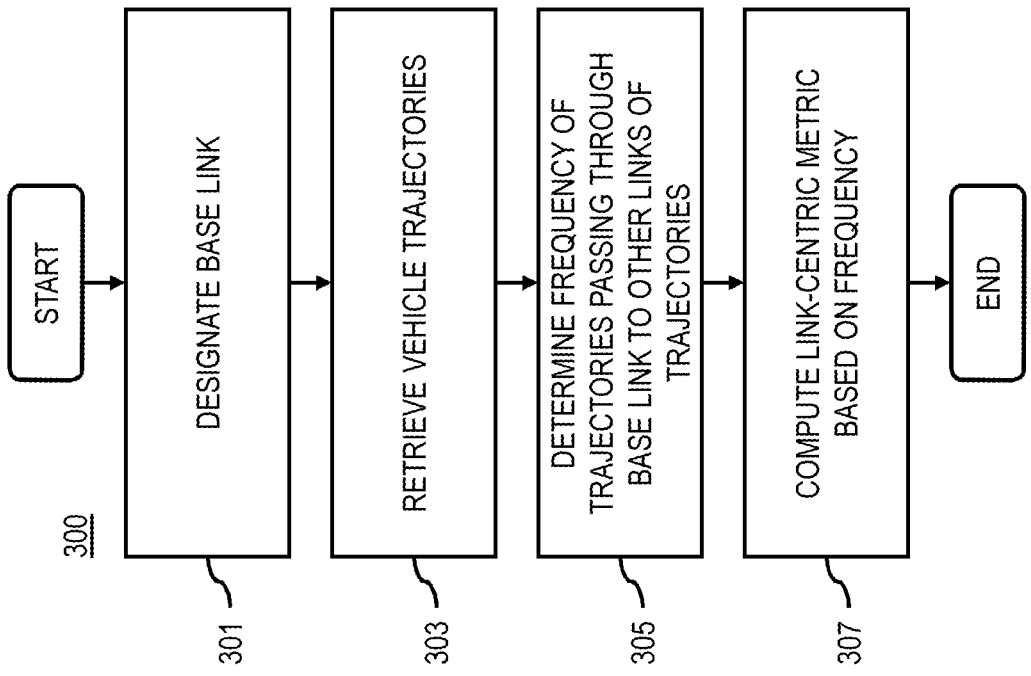
FIG. 3 is a flowchart of a process for providing a localized link-centric metric for directional traffic propagation, according to one embodiment.
Figure 12:
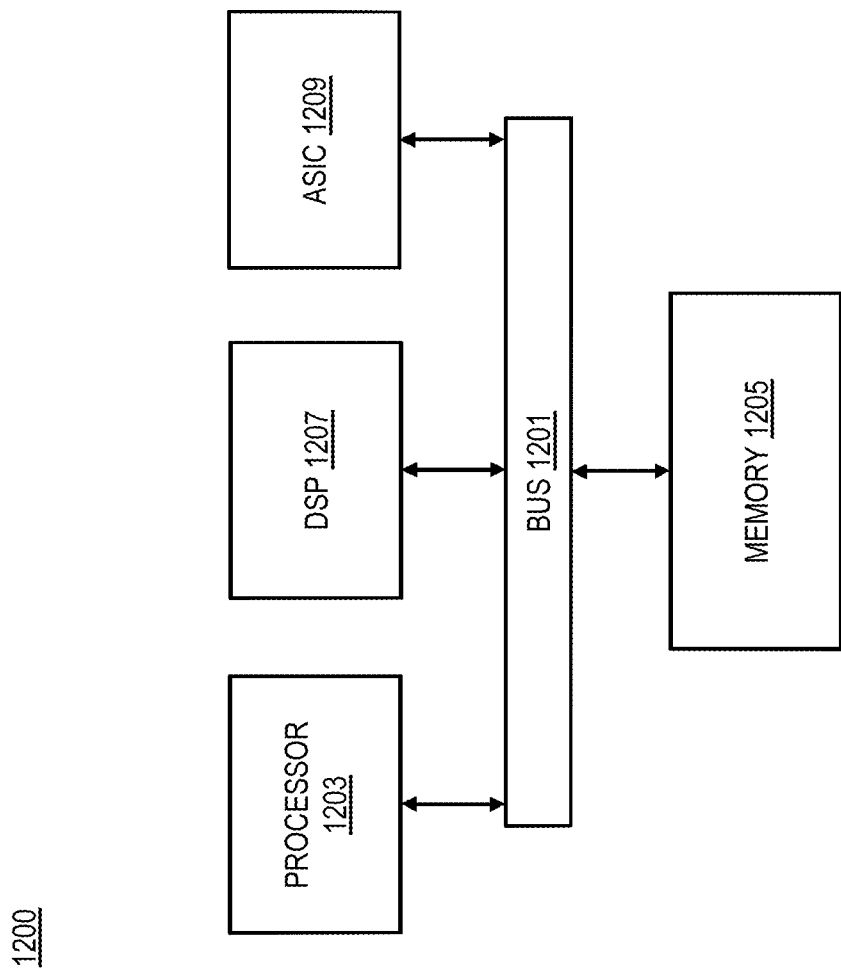
FIG. 12 is a diagram of a chip set that can be used to implement the system and/or functions thereof, according to one embodiment.

FIG. 3 is a flowchart of a process for providing a localized link-centric metric for directional traffic propagation, according to one embodiment. In various embodiments, the traffic modeling platform 107 and/or the modules 201-207 of the traffic modeling platform 107 as shown in FIG. 2 may perform one or more portions of the process 300 and may be implemented in, for instance, a chip set including a processor and a memory as shown in FIG. 12. As such, the traffic modeling platform 107 and/or the modules 201-207 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

As previously discussed, the model or metric discussed with respect to the various embodiment described herein is link-centric in the sense that the traffic modeling platform 107 considers the distribution of vehicle paths or trajectories that flow through a particular (fixed) link. More generally, the traffic modeling platform 107 can consider the distribution of any set of probe trajectories that flow through a particular segment of the trajectories. As previously discussed, a link-centric approach is provided to illustrate one example use case of the metric described herein, and it is contemplated in other use cases, probe trajectories can be segmented according to any feature to determine a more general feature-centric or segment-centric metric. Therefore, any description of the embodiments with reference to links can equivalently apply to any trajectory segment or feature used to segment the probe trajectories. Furthermore, any descriptions of the traversal of a road network would also equivalently apply to the traversal or partial traversal of any process that can be sensed by a probe device.

Returning to the link example, in one embodiment, the fixed or designated link will often be referred to as the "base link". In more general terms, the fixed or designated segment can be referred to as the "base segment" or as the "base token" when the trajectory segments are represented in tokenized form as further described below. In one embodiment, links appearing prior to the base link in individual vehicle trajectories within some subsequence length tolerance (e.g., a proximity threshold based on the number of links) can be referred to as "inflow links". This term can also be applied to the aggregation of data over all vehicle trajectories in the data set (similarly for "outflow links" as those occurring after the base link). Accordingly, in step 301, the metric computation module 205 designates a base link of the road network. In one embodiment, this designation can be based on a user input. In addition or alternatively, the metric computation module 205 can automatically designate the base link. For example, the metric computation module 205 can detect links on which traffic disturbances are occurring (e.g., based on received traffic incident reports, probe data, etc.) and then designate the link or links for determining a link-centric metric to determine traffic propagation from that link.

In step 303, the data pre-processing module 201 retrieves a plurality of vehicle trajectories including the base link. By way of example, the vehicle trajectories are based on probe data collected from one or more sensors of vehicles travelling in the road network. In other words, the metric computation module 205 initiates the link-centric metric computation process by selecting a base link and providing a collection of those vehicle trajectories that pass through the base link. The vehicle trajectories can be collected and processed in real-time to provide a real-time link-centric metric. In addition or alternatively, the vehicle trajectories can be historical or batch collected probe data to provide for a historical or batch link-centric metric.

Figure 4:
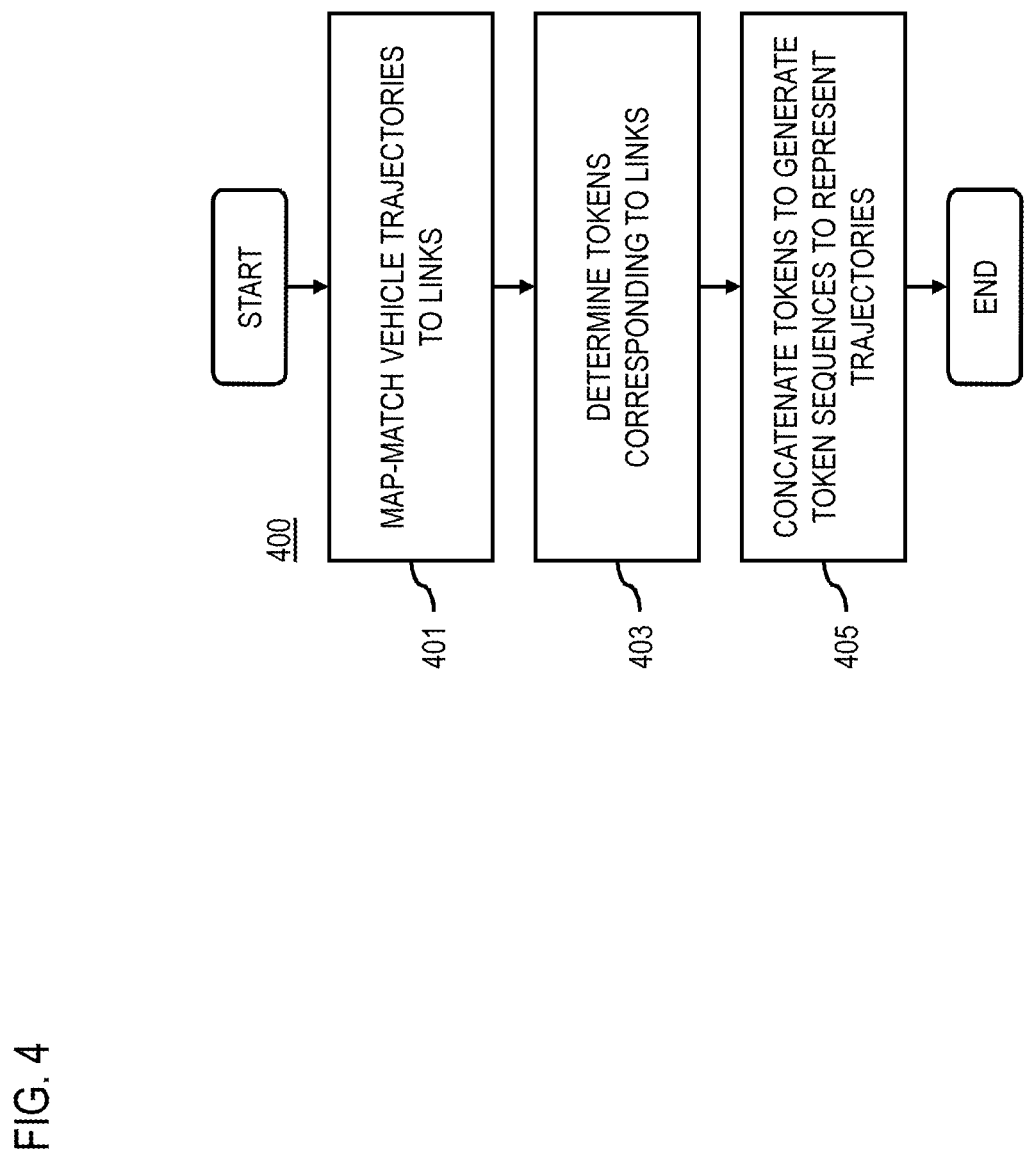
FIG. 4 is a flowchart of a process for compressing vehicle trajectories into token sequences, according to one embodiment.

In one embodiment, each of the plurality of vehicle trajectories can optionally represented as a token sequence. Each token in the token sequence is a tokenized representation of a respective link in a sequence links to which the vehicle trajectories are map-matched. The tokenized representation, for instance, can be generated by the tokenization module 203 according to the process 400 of FIG. 4. For example, FIG. 4 is a flowchart of a process for compressing vehicle trajectories into token sequences, according to one embodiment. The traffic modeling platform 103 and/or any of the modules 201-207 can perform the process 400 alone or in combination, and therefore represent means for performing the process 400. Although the process 400 is illustrated and described as a sequence of steps, it is contemplated that various embodiments of the process 400 may be performed in any order or combination and need not include all of the illustrated steps.

In step 401, the tokenization module 203 compresses the vehicle trajectories into token sequences by first map-matching the vehicle trajectories to links of a road network. The map-matching, for instance, involves matching the geographic coordinates of each probe point contained in the individual vehicle trajectories to specific link, portion or a link, location, node, etc. of a geographic database 109 that stores map data for the corresponding geographic area. In other words, the link of the road network corresponds to a link record, a node record, and/or any other representation of a road segment, location, geographic area, or portion thereof stored in the geographic database 109. This initial map-matching results in a sequence of links (e.g., link ID's) corresponding to each vehicle trajectory.

In step 403, the tokenization module 203 determines tokens corresponding to the map-matched sequence of links. A token, for instance, is an abstract or symbolic representation of a link, such that the token uniquely identifies an individual link or link ID. In one embodiment, the tokenization module 203 creates a lookup table to associate each token with a corresponding link. In this way, for instance, link information associated with said each token is obtained from the lookup table.

In step 405, the tokenization module 203 concatenates the plurality of tokens to generate token sequences to represent a sequence of links occurring in the individual vehicle trajectories. In one embodiment, the traffic modeling platform 107 can process the token sequences in place of the vehicle trajectories to compute the link-centric metric. As previously discussed, tokenization enables data compression of the vehicle trajectories into a more storage-space efficient representation, thereby advantageously reducing computer storage requirements as well as associated bandwidth and processing requirements for processing the vehicle trajectories versus the tokenized representation. However, when minimizing resource usage is not a primary concern, the traffic modeling platform 107 skip or not perform the tokenization step and process the vehicle trajectories or the map-matched link sequences directly.

Figure 5:
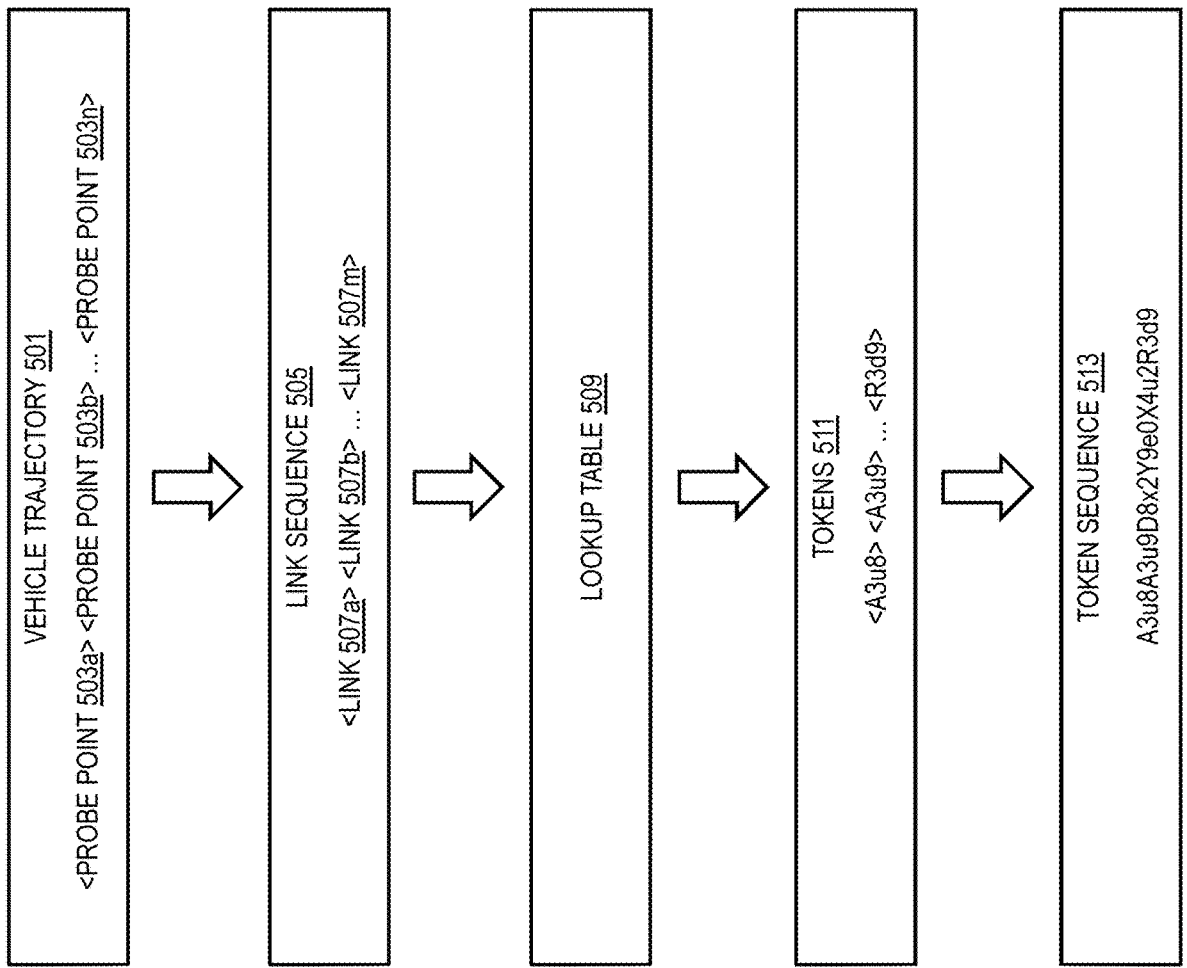
FIG. 5 is a diagram illustrating an example tokenized representation of a vehicle trajectory, according to one embodiment.

FIG. 5 is a diagram illustrating an example tokenized representation of a vehicle trajectory, according to one embodiment. In the example of FIG. 5, the tokenization module 203 retrieves a vehicle trajectory 501 containing probe data including probe points 503a-503n (also collectively referred to as probe points 503). As previously described, each probe point 503 specifies at least a time stamp and geographic coordinates indicating a location determined by a collecting vehicle 101's location sensor (e.g., a GPS sensor). The coordinates of the probe points 503 are then map-matched using any map matching process known in the art to determine a link sequence 505 comprising links 507a-507m (also collectively referred to as links 507) arranged according to the respective time stamps of the probe points 503.

The tokenization module 203 then creates or uses an existing lookup table 509 that uniquely cross references an individual link 507 to a corresponding token, to a create a set of tokens 511. In this example, the tokens are alphanumeric strings that are four-characters long. The first character of each string is capitalized so that when the tokens are concatenated, the start of each individual token in the token sequence is more easily readable. The tokens 511 are then concatenated in order of the time stamps of the probe points 503 of the original vehicle trajectory 501 to create a token sequence 513 (e.g., "A3u8A3u9D8x2Y9e0X4u2R3d9"). This token sequence 513 represents the compressed and tokenized version of the vehicle trajectory 501 and can be used for computing the link-centric metric according to the various embodiments described herein.

In one embodiment, the data pre-processing module 201 can perform a pre-processing step by removing each instance of duplicate consecutive links from the vehicle trajectories prior to the computing of the link-centric metric. The removal of duplicate consecutive links advantageously results in further data compression, and can be performed on the link sequence map-matched from the vehicle trajectory before tokenization or after tokenization.

Returning to the process 300 of FIG. 3, in step 305, the metric computation module 205 determines a frequency at which the retrieved vehicle trajectories passes through the base link to each of one or more other links in the vehicle trajectories. In one embodiment, the other links to consider are within a proximity threshold of the base link. By way of example, the process for determining the frequency to calculate the link-centric metric can be described with respect to the conventions and terminology or equivalent described below.

In summary, the link-centric process is initiated by selecting a base link and providing a collection of those vehicle trajectories that pass through the base link, with the additional optional pre-processing step of removal of duplicate consecutive link instances from all trajectories. Call the base link $l_0$ and the collection of trajectories passing through it $\mathcal{T}$. In addition to $l_0$, the metric computation module 205 can also consider the following parameters:

n=maximum lookback/lookforward length from the base link $l_0$ within each trajectory (e.g., the proximity threshold for determining which links to consider in each vehicle trajectory; in an embodiment in which the vehicle trajectories are represented as token sequences, the proximity threshold is based on a number of tokens from the base link within the token sequence);

m=parameter for number of top inflow/outflow links (e.g., for visualization and other use case applications); and $f$=scoring function: measures proximity of links to base link in an individual trajectory.

In one embodiment, n and m optionally can be split into separate parameters for inflow and outflow analysis. For example, in one embodiment, the link-centric metric includes an inflow metric that is computed based on an inflow portion of the plurality of vehicle trajectories flowing into the base link, and an outflow metric that is computed based on an outflow portion of the plurality of vehicle trajectories flowing from the base link. In a use case in which the vehicle trajectories are tokenized, the metric computation module 205 designates one or more tokens occurring before the base link as one or more inflow tokens for said each of the plurality of token sequences. The metric computation module 205 then calculates an inflow metric of the link-centric metric based on the one or more inflow tokens. Similarly, the metric computation module 205 designates one or more tokens occurring after the base link as one or more outflow tokens. The metric computation module 205 then calculates an outflow metric of the link-centric metric based on the one or more outflow tokens.

In one embodiment, the choice of values for the parameters described above can depend on the structure of the input data, or from a recursive determination of which parameter values best predict ground truth traffic propagation data. Alternatively, the parameters can be set to default value such as n=m=10.

In one embodiment, the metric computation module 205 can use any monotic function as the scoring function $f$ that results in decreasing weight adjustments for nearby links based on their respective distance from the base link. The distance, for instance, can be measured based on a number of links or tokens, or on an actual distance (e.g., meters, miles, etc.) between the nearby links and the base link. In one embodiment, the choice for $f$ is a function based on powerlaw behavior, i.e. $f(x)=|x|^{-\alpha}$ with $\alpha>0$. By way of example, $\alpha$ can be set to 1 in a default case or can be selected based on matching predicted results against ground truth traffic propagation data.

In step 307, the metric computation module 205 computes a link-centric metric for each of the links other than the base link relative to the base link based on the frequency determined in step 305. In one embodiment, the metric computation module 205 measures a proximity of the other links to the base link in each individual trajectory to determine a respective score for each link based on the scoring function $f$. The link-centric metric is then further based on the respective score for each of the links.

More specifically, in one embodiment, for each trajectory T in $\mathcal{T}$, the metric computation module 205 uses $T=\{1_{-N_1}, \ldots, 1_0, \ldots, 1_{N_2}\}$ to represent the vehicle trajectory as its (unique) link sequence, where $l_0$ is the base link. The metric computation module 205 then defines the following functions:

$$\Gamma_-(T;k)=f(k)\chi_{\chi\{max\{-n,-N_i\}\le k\le 0\}}$$

$$\Gamma_+(T;k)=f(k)\chi_{\chi\{0<k\le min\{n,N_2\}\}}$$

These equations represent the inflow and outflow correlation scores, respectively, for a given link having distance k from the base link in a particular trajectory T. $f$ is the scoring function discussed previously, and $\chi_A$ denotes the characteristic function of the set A. From these individual trajectory correlation scores, the metric computation module 205 can express the aggregate trajectory correlation scores (e.g., aggregate of all retrieved vehicle trajectories) of a particular link relative to the base link as:

$$\rho_-(l;l_0)=\sum_{l\in T\in\mathcal{T}}\Gamma_-(T;ind(l))$$

$$\rho_+(l;l_0)=\sum_{l\in T\in\mathcal{T}}\Gamma_+(T;ind(l))$$

Here, ind(l) refers to the integer index of l in T with the sequence representation of T given above (in other words, it is the signed distance in link sequence elements from the base link to l). This gives two directional flow correlations for any link relative to the base link (e.g., $\rho_-(l; l_0)$ representing the inflow direction, and $\rho_+(l; l_0)$ representing the outflow direction). The link l can then be classified as an inflow or outflow link by whichever of these values is larger to represent the link-centric metric. Put another way, the metric computation module 205 defines:

$$\sigma(l;l_0)=1-2_{\chi\{\rho_->\rho_+\}}$$

$$F(l;l_0)=\sigma\max\{\rho_-,\rho_+\}$$

In one embodiment, the metric computation module 205 determine the link lengths of the various links in the retrieved vehicle trajectories and adjust the link-centric metric accordingly. for example, the metric computation module 205 can determine a respective link length for each of the links. The metric computation module 205 then normalizes the link-centric metric for each of the links based on the respective link length. For example, the metric computation module 205 can normalize the respective link-centric metric score for each link by multiplying the score by the length of the respective link divided by the maximum link length of the links included in the link-centric metric computation. The metric computation module 205 can also use any other equivalent normalization procedure.

Figure 6:
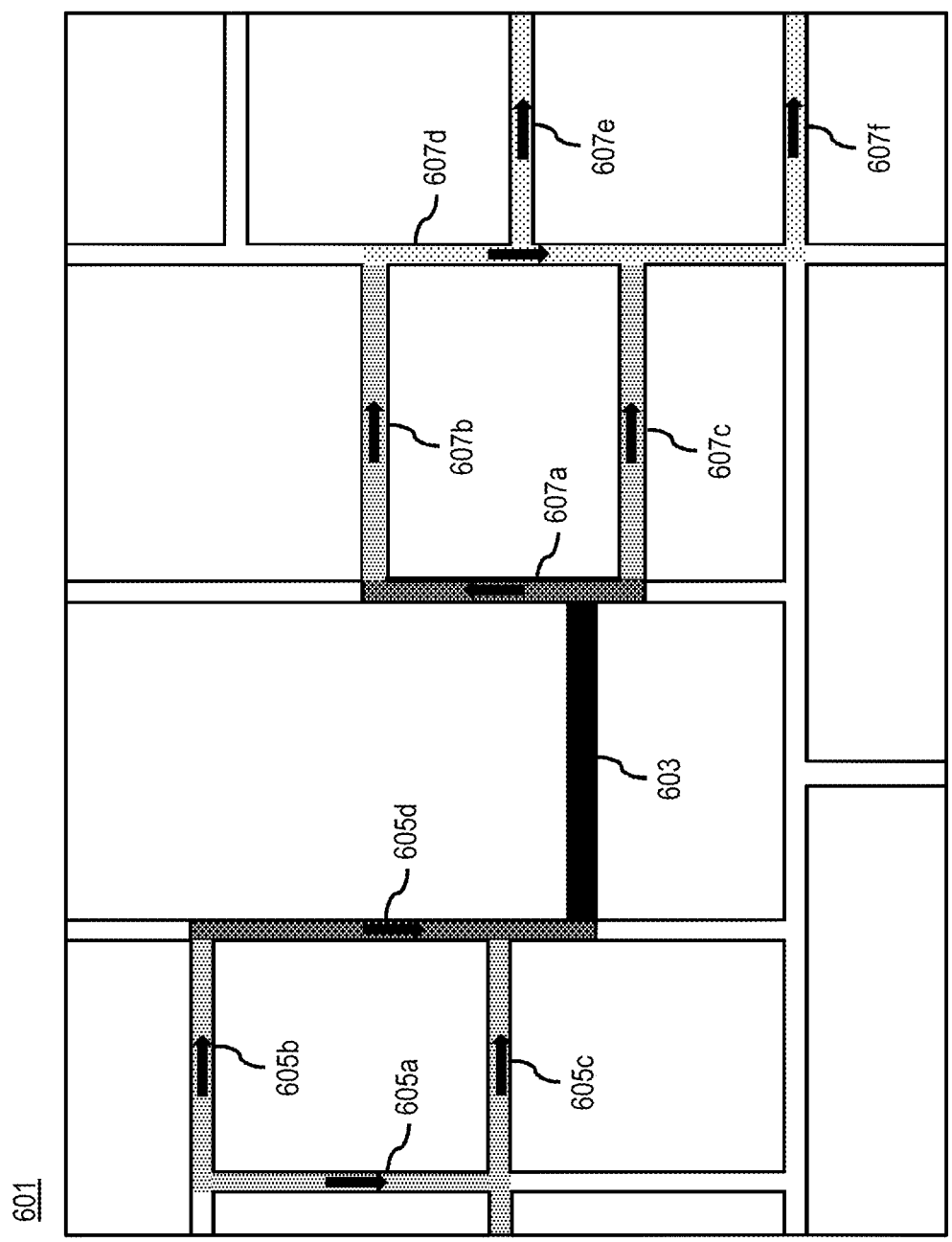
FIG. 6 is a diagram illustrating an example visualization of a link-centric metric, according to one embodiment.

In one embodiment, the application module 207 determines a visual representation of the base link, the one or more other links, or a combination thereof based on the link-centric metric. The application module 207 can then present the visual representation in a mapping user interface depicting the road network as shown in FIG. 6. In one embodiment, the application module 207 determines a number of the one or more other links to present the in the mapping user interface based on the link-centric metric. In other words, the application module 207 determines the m strongest inflow links relative to $l_0$ which are given by the m smallest values attained by F (e.g., the link-centric metric or correlation measure) across all possible choices of l. Likewise the m strongest outflow links are given by the m largest values of the link-centric metric.

FIG. 6 is a diagram illustrating an example visualization of a link-centric metric, according to one embodiment. As shown, the traffic modeling platform 107 initiates a presentation of a mapping user interface 601 to present the visual representations of the link-centric metrics for the links most correlated with a designated base link 603. As described above, the link-metric measures the frequency of all retrieved vehicle trajectories pass through both a specific neighboring link and the base link 603. The base link 603 is visualized as black to indicate that it is the base link. Then top most correlated links (e.g., the m most correlated are shaded from dark to light indicating most correlated to least correlated. The inflow links 605a-605d (also collectively referred to as inflow links 605) are indicated by arrows pointing towards the direction of the base link 603, and the outflow links 607a-607f (also collectively referred to as outflow links 607) are indicated by arrows pointing away from the base link 603. In a color visualization, the inflow links 605 and the outflow links 607 can be represented using different colors, with the shade of the respective colors indicating the magnitude of correlation of the link-centric metric.

In this example, inflow link 605d is the nearest link to the base link 603 has the darkest shading of the inflow links 605, indicating that a larger frequency of the vehicle trajectories that pass through the inflow link 605d also passes through the base link 603. While the inflow link 605a has the lightest shading and correlation based on the link-centric metric, indicating that a lower frequency of vehicle trajectories passes through both inflow link 605a and base link 603. Similarly, outflow link 607a is nearest the base link 603 and is shaded darkest of the outflow links 607 to indicate that a high frequency of vehicle trajectories passes through both the base link 603 and the outflow link 607a.

As previously discussed, the link-centric metric computed according to the various embodiments described herein can be used for any number of use cases or applications. Some example use cases are discussed with respect to FIGS. 7 and 8. It is contemplated that these use cases are provided by way of illustration and not as limitations.

Figure 7:
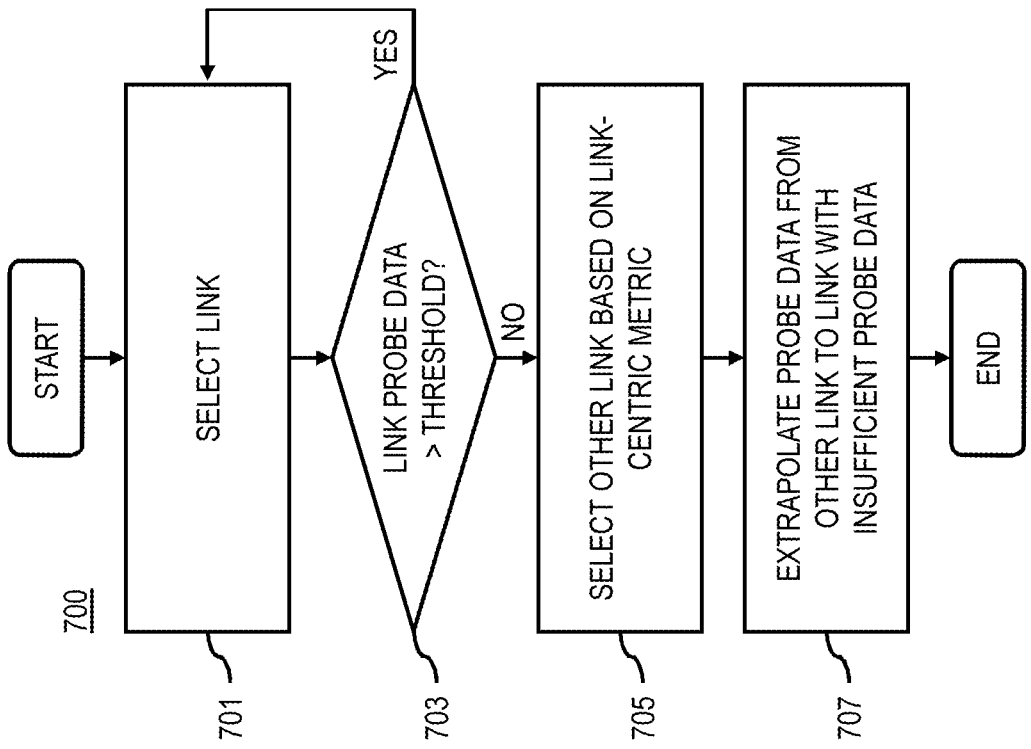
FIG. 7 is a flowchart of a process for gap-filling probe data for a link based on a link-centric metric, according to one embodiment.

FIG. 7 is a flowchart of a process for gap-filling probe data for a link based on a link-centric metric, according to one embodiment. In various embodiments, the traffic modeling platform 107 and/or the modules 201-207 of the traffic modeling platform 107 as shown in FIG. 2 may perform one or more portions of the process 700 and may be implemented in, for instance, a chip set including a processor and a memory as shown in FIG. 12. As such, the traffic modeling platform 107 and/or the modules 201-207 can provide means for accomplishing various parts of the process 700, as well as means for accomplishing embodiments of other processes described herein in conjunction with other components of the system 100. Although the process 700 is illustrated and described as a sequence of steps, it is contemplated that various embodiments of the process 700 may be performed in any order or combination and need not include all of the illustrated steps.

As discussed above, data sparsity can be a problem if there is not sufficient probe penetration throughout the road network. This can lead to some links of the road network not having sufficient or any amount of current or historical probe data. In one embodiment, the traffic modeling platform 107 can use the link-centric metric to determine how to fill the data gap.

In step 701, the application module 207 selects a link of the road network to evaluate for possible gap filling. In step 703, the application module 207 determines whether the selected link has an amount of probe data that meets or does not meet a threshold value. For example, the threshold can specify a minimum number or probe points or vehicle trajectories that are available for the selected link. In one embodiment, the threshold value can also have a time component, so that data sparsity can also be based on how much probe data is available from a designated time period (e.g., a most recent time epoch or other time period of interest). If the selected link has sufficient probe data (e.g., an amount that meets the threshold), the application module 207 returns to step 701 to evaluate another link or ends the process 700 if no other links are to be evaluated for gap filling.

If the application module 207 determines that an amount of the probe data does not meet a threshold value for one or more links of the road network, the application module 207 selects one or more other links of the road network that have the amount of the probe data that meets the threshold value based on the link-centric metric (step 705). For example, the traffic modeling platform 107 can compute the link-centric metric for the selected link or a link neighboring the selected within a proximity threshold. The application module 207 can then determine which link or links neighboring the selected link is most correlated (e.g., highest link-centric metric, or with a link-centric metric meeting a minimum threshold) and has available probe data that meets the data threshold level.

In step 707, the application module 207 extrapolates the probe data from the one or more other selected links to the link with insufficient or no probe data. In one embodiment, extrapolation can include copying the probe data or traffic properties indicated by the probe data of the other selected links to the link with insufficient probe data without adjustment. In another embodiment, the probe data or traffic properties can be adjusted by the value of the link-centric metric (e.g., degree of correlation) to extrapolate the data.

Figure 8:
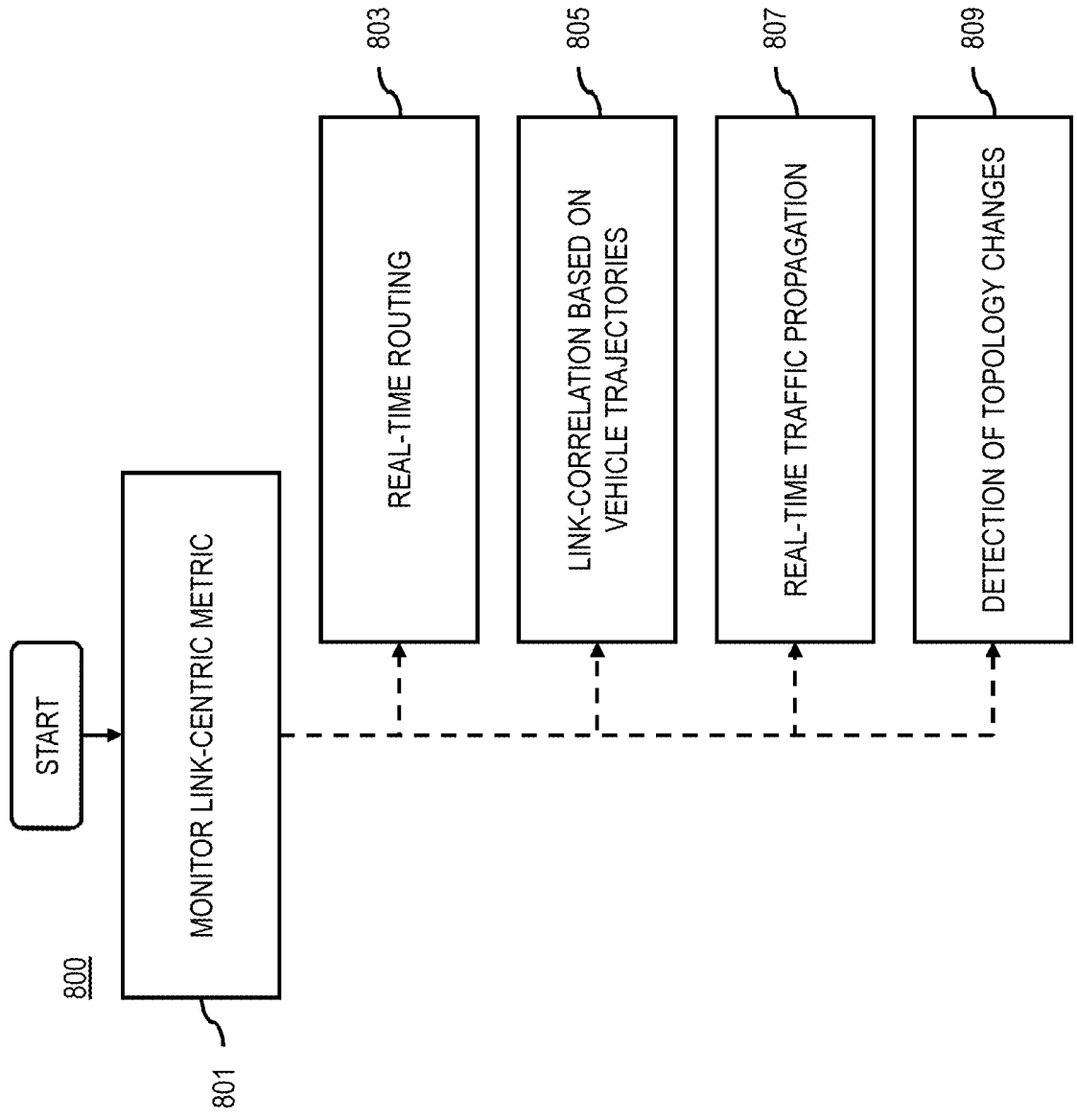
FIG. 8 is a flowchart of a process for monitoring a link-centric metric to support various example use cases, according to one embodiment.

FIG. 8 is a flowchart of a process for monitoring a link-centric metric to support various example use cases, according to one embodiment. In various embodiments, the traffic modeling platform 107 and/or the modules 201-207 of the traffic modeling platform 107 as shown in FIG. 2 may perform one or more portions of the process 800 and may be implemented in, for instance, a chip set including a processor and a memory as shown in FIG. 12. As such, the traffic modeling platform 107 and/or the modules 201-207 can provide means for accomplishing various parts of the process 800, as well as means for accomplishing embodiments of other processes described herein in conjunction with other components of the system 100. Although the process 800 is illustrated and described as a sequence of steps, it is contemplated that various embodiments of the process 800 may be performed in any order or combination and need not include all of the illustrated steps.

In step 801, the metric computation module 205 monitors the link-centric metric for one or more base links. Based on this monitoring, the metric computation module 205 interacts with the application module 207 to perform one or more functions based on the link-centric metric such as the functions of the example use cases illustrated in the steps 803-809 of the process 800. It is contemplated that the steps 803-809 can be performed alone or in any combination.

For example, in step 803, the application module 207 can use the link-centric metric to generate real-time routing instructions, a time of arrival estimate, or a combination thereof based on the link-centric metric. Referring to the example of FIG. 6, if there is a traffic disturbance such as an accident on the base link 603 that is obstructing the flow of traffic from the moving through the base link 603, the traffic on links with high correlations to the base link 603 as indicated by the link-centric metric are likely to be affected by the accident. The effects can be different depending on whether the affected link is an inflow link 605 or an outflow link 607.

Figure 9A:
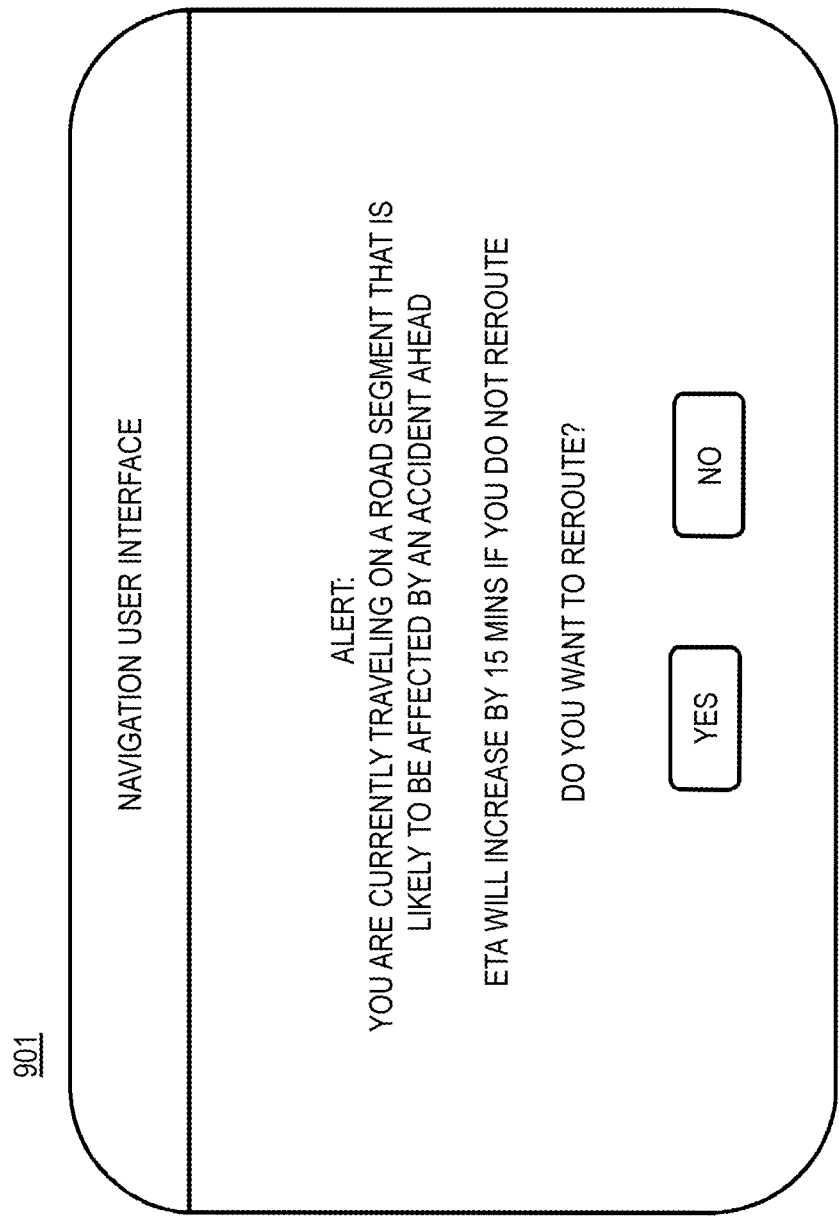
FIGS. 9A-9C are diagrams illustrating respective user interfaces for the example use cases of FIG. 8, according to one embodiment.

Traffic on inflow links 605 for instance, are likely to increase in proportion of their respective link-centric metric correlations because traffic movement from those links through the base link 603 would be impeded, which would lead to traffic backing up onto the inflow links 605 Accordingly, the application module 207 can reroute a vehicle to avoid the inflow links 605 or if the inflow links 605 cannot be avoided to reach a destination, the application module 207 can increase the ETA based in proportion to the correlation indicated by the link-centric metric. FIG. 9A illustrates an example navigation user interface (UI) 901 that alerts a driver that he or she is on an inflow road segment for an upcoming accident location. The UI 901 can also provide an updated ETA if the driver remains on the current route, and present options to reroute around the inflow links 605 to other links that are not correlated to the base link 603 as indicated by a corresponding link-centric metric.

In the case of the outflow links 607, the traffic effects can be the opposite of inflow links 605. For example, because normal traffic is impeded from flowing from the base link 603 to the outflow links 607, the traffic volume on the outflow links 607 can potentially decrease during the accident on the base link 603. Accordingly, the application module 207 can re-route vehicles through the outflow links 607 to take advantage of the potentially reduced traffic conditions. If the vehicle is already routing through the outflow links 607, the application module 207 can decrease the ETA accordingly.

In another use case, the application module 207 can use the link-centric metric to perform link-correlation based on vehicle trajectories or paths (step 805). Link-correlation, for instance, can be used to determine the traffic flow relationships among neighboring links to assist in traffic management or planning. As described above, the link-centric metric is based on the determined frequency of vehicle trajectories that pass between each neighboring link and the base link as an indicator of link-correlation. By comparing the correlations indicated by the link-centric metric between alternative neighboring links and the base link (e.g., when multiple paths are possible to and from the base link), the application module 207 can determine which links are more likely to be in the same link sequence for a given vehicle trajectory through the base link.

In another use case that builds on the link correction of step 805, the application module 207 can use the link-centric metric to monitor real-tile traffic propagation within a road network (e.g., traffic prediction) (step 807). For example, based on the link correlations of the link-centric metric, the application module 207 can predict the likely paths flowing both into and away from the base link. As previously discussed, the grid pattern of streets found in many urban areas can make it difficult to predict traffic flow from a given link even if the road geometry is known because of the grid pattern provides multiple paths for carrying traffic that may or may not interfere with each other. By selecting a designated base link as a frame of reference, the link-centric metric can more precisely model the traffic flow from that base link. In one embodiment, to provide an overall picture of traffic propagation in the road network, the traffic modeling platform 107 can select multiple base links throughout the road network and compute respective link-centric metrics with respect to each selected base link. To reduce computations, the traffic modeling platform 107 can select base links that are expected to exhibit or have historically exhibited traffic disturbances. However, if resources are not constrained or limited, the traffic modeling platform 107 can calculate link-centric metrics for with each link of the road network designated as base link with respect to its neighboring links.

In step 809, the application module 207 can use the link-centric metric to detect topology changes in the road network using just vehicle trajectories without prior knowledge of the underlying topology of the road network or other process being modeled by the probe or vehicle trajectories. Through analysis of the topological structure of link-centric metric visualizations or diagrams as a function of time, the traffic modeling platform 107 can automatically detect likely locations of changes in traffic patterns. The changes can include, but are not limited to, newly-implemented turn restrictions, large-scale changes in traffic patterns due to construction projects and the resulting rerouting of traffic, and/or the like.

Figure 9B:
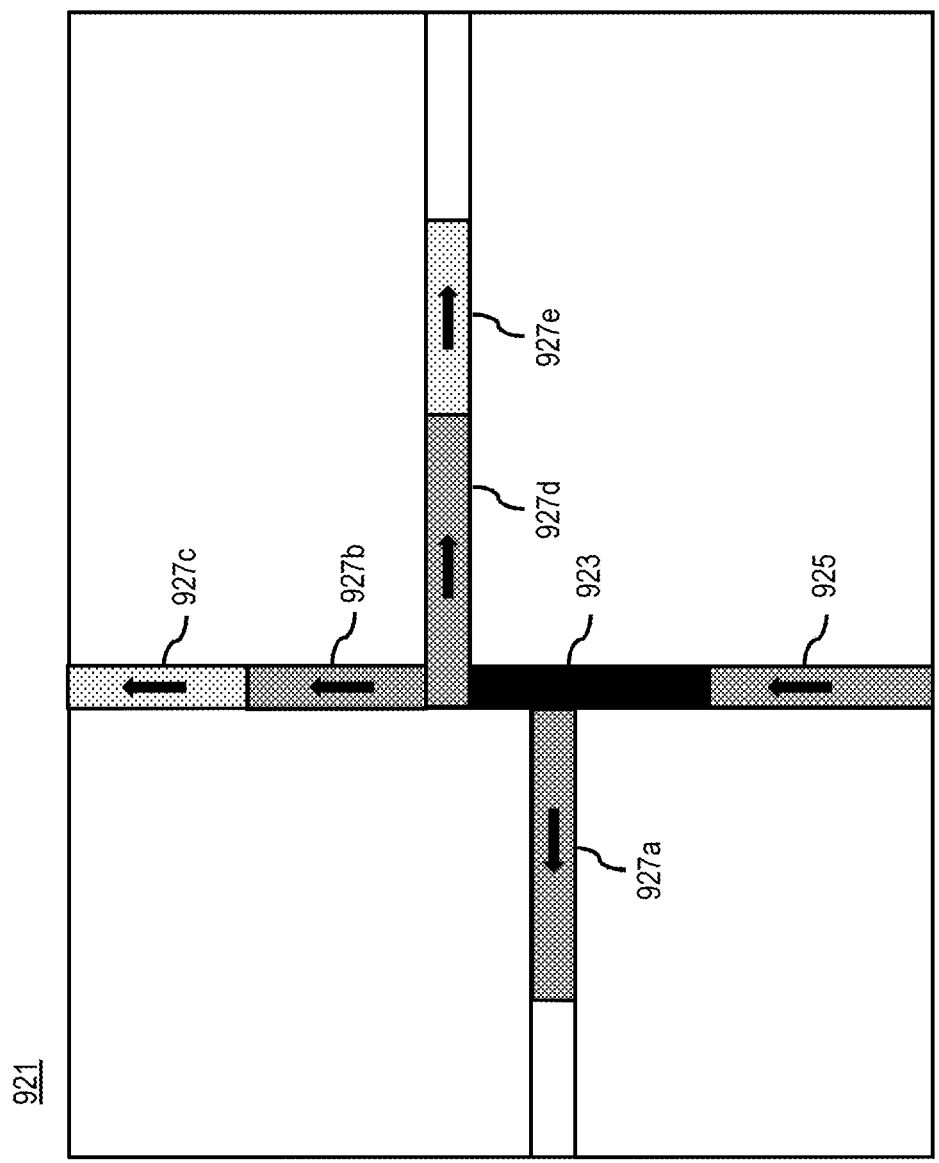
Figure 9C:
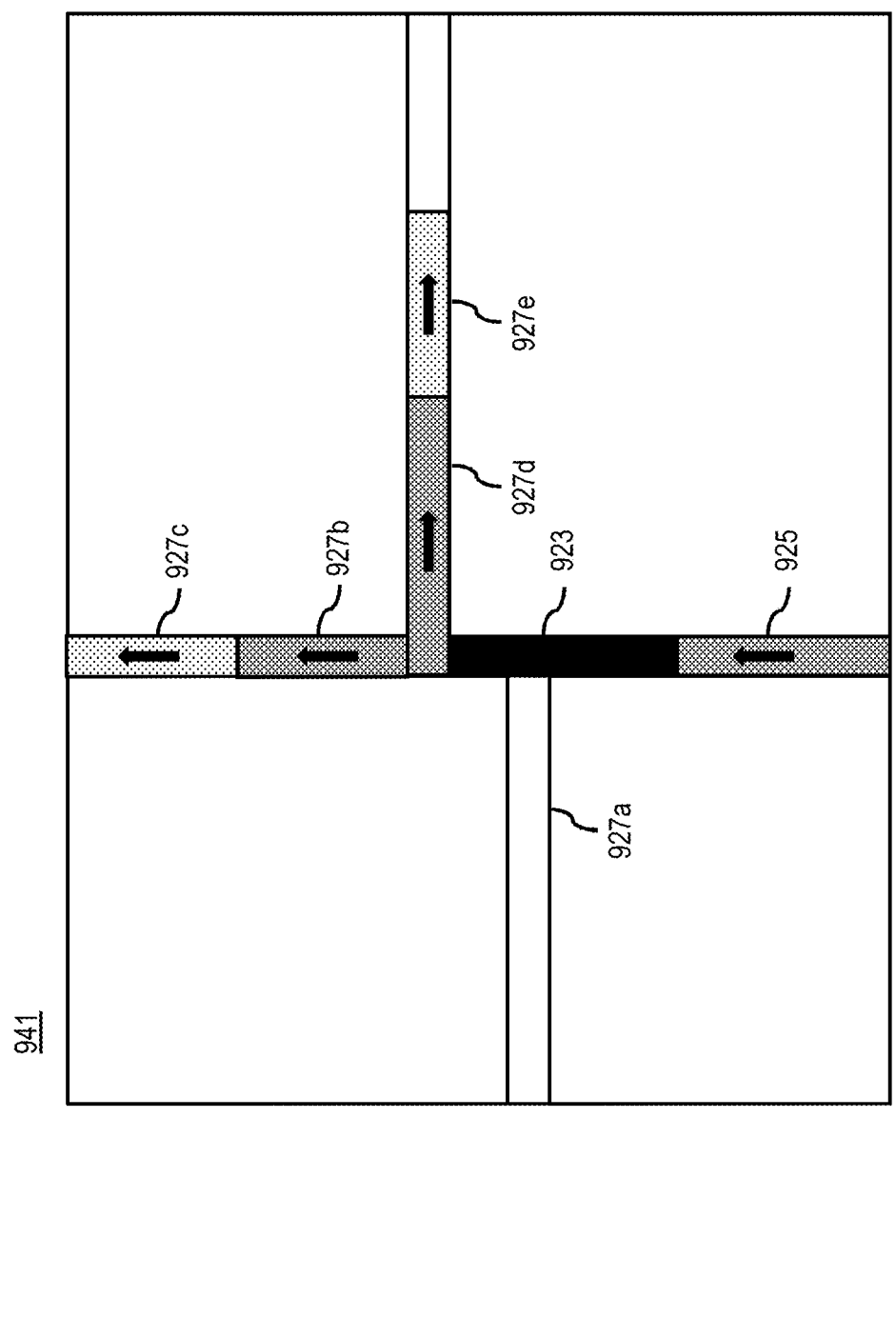

FIGS. 9B and 9C are diagrams illustrating topology changes based on a newly-implemented turn restriction, according to one embodiment. FIG. 9B illustrates the link-centric metric topology in a mapping UI 921 for a time period before implementation of the turn restriction. As shown, the traffic modeling platform 107 selects a base link 923 to calculate link-centric metrics for an inflow link 925 and outflow links 927a-927e. In this example, a turn restriction will be implemented on outflow link 927a. However, before the turn restriction, the outflow link 927a is correlated with the base link 923 indicating that a significant frequency of vehicle trajectories passes from the base link 923 to the outflow link 927a indicating that the turn onto outflow link 927a is commonly made.

FIG. 9C illustrates the link-centric metric topology for the same area as FIG. 9B but for a time period after implementation of the turn restriction from the base link 923 to the outflow link 927a. This effect of the turn restriction is apparent in the mapping UI 941 as the link 927a is no longer determined to be an outflow link with respect to the base link 923 and is no longer shaded. This is because few if any vehicle trajectories turn from the base link 923 to the link 927a in compliance with the newly implemented turn restriction. Accordingly, a comparison between the mapping UI 921 of FIG. 9B and the mapping UI 941 of FIG. 9C would indicate the changed topology.

Figure 10:
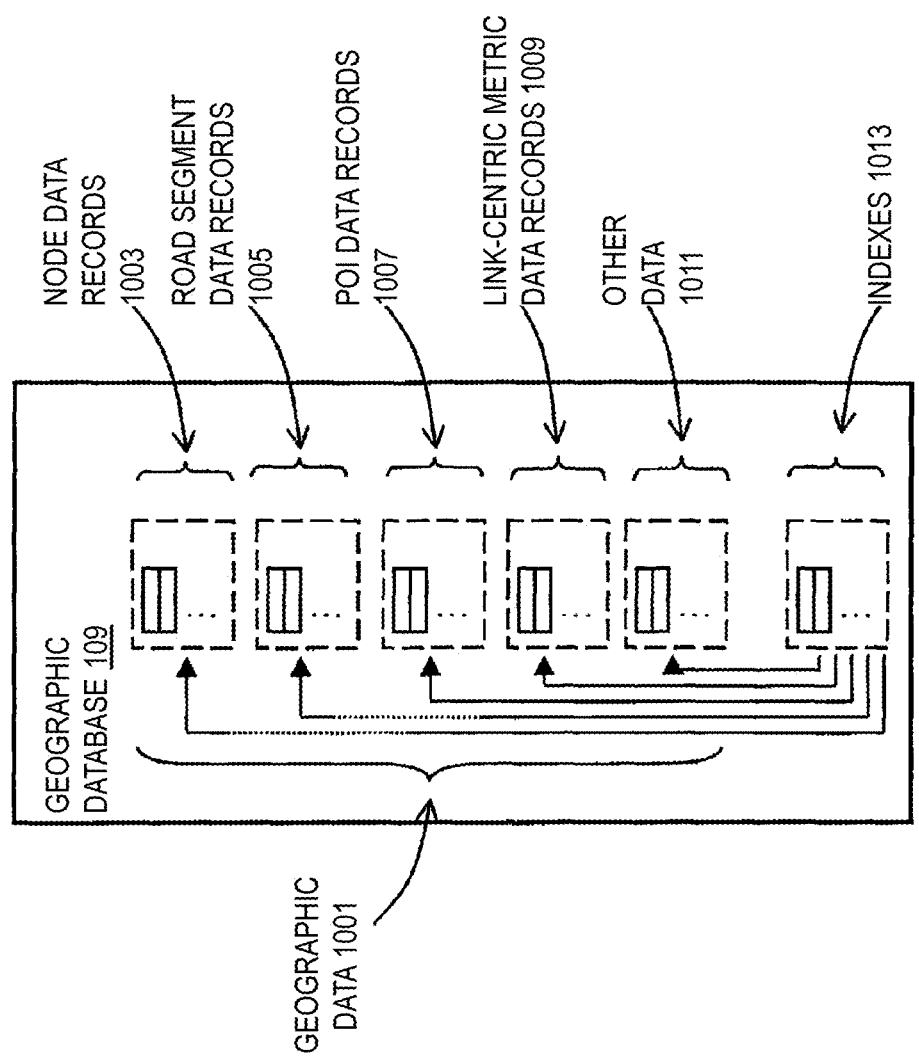
FIG. 10 is a diagram of a geographic database, according to one embodiment.

FIG. 10 is a diagram of the geographic database 109 of system 100, according to exemplary embodiments. In the exemplary embodiments, vehicle trajectories, tokenized representations of the trajectories, token lookup tables, computed link-centric metrics, and/or any other data used by the system 100 as described in the various embodiments can be stored, associated with, and/or linked to the geographic database 109 or data thereof. In one embodiment, the geographic database 109 includes geographic data 1001 used for (or configured to be compiled to be used for) mapping and/or navigation-related services, such as for personalized route determination, according to exemplary embodiments. For example, the geographic database 109 includes node data records 1003, road segment or link data records 1005, POI data records 1007, link-centric metric data records 1009, other data records 1011, and/or indexes 1013, for example. More, fewer or different data records can be provided.

In one embodiment, the node data records 1003 and the road link data records 1005 represent a road network, such as used by vehicles, cars, and/or other entities. In other words, the nodes and links of the data records 1003 and 1005 comprise a system for representing the geospatial characteristics of a transportation in which the nodes represent various location points (e.g., latitude and longitude) of the network and the links represent an extent of a road or path between the nodes. Generally, the nodes are located at intersections points of the road network to minimize the number of nodes needed to represent a transportation network. However, in some embodiments, a node can also fall at a non-intersection point. In this case, the node at the non-intersection can be a shape node which can be used to indicate or more closely follow a road or path with a more complex shape. Alternatively, the geographic database 1001 can contain path segment and node data records or other data that represent pedestrian paths or areas in addition to or instead of the vehicle road record data, for example.

The road link and nodes can be associated with attributes, such as a functional class, a road density or link length, a speed attribute (e.g., speed limit along a link, a free-flow speed of traffic along a link, and/or any other indication of an expected speed of travel along the link), parking availability information, geographic coordinates, street names, address ranges, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. In one embodiment, the link-centric metric can also be stratified according to any combination of the link attributes and/or any other data record stored in the geographic database 109. As indicated above, the geographic database 109 can include data about the POIs and their respective locations in the POI data records 1007. The geographic database 109 can also include data about places, such as cities, towns, or other communities, and other geographic features, such as bodies of water, mountain ranges, etc. Such place or feature data can be part of the POI data or can be associated with POIs or POI data records 1007 (such as a data point used for displaying or representing a position of a city).

In one embodiment, the geographic database 109 also includes link-centric data records 1009 for storing information about designated base links, related vehicle trajectories, tokenized representations trajectories, link-centric metrics, etc. with respect to the links or road segments stored in the geographic database 109. For example, the link-centric data records 1009 may store one or more lookup tables that associate tokens with corresponding link information stored in the geographic database 109. In one embodiment, it contemplated that token lookup table can be generated for and/or applicable to all links stored in the geographic database, a subset of the links, or individual links. In other words, the dictionary can be generated at different levels of granularity within a road network. In one embodiment, the granularity can be based on the attributes of links (e.g., a functional class, etc.). For example, a lookup table or token can be generated to represent links in a particular functional class (e.g., arterial roadways) or another link attribute. The resulting tokens can then be used for representing and computing link-centric metrics for that particular functional class or other link attribute. In yet another embodiment, the link-centric metric data records 1009 also store real-time or historical vehicle trajectories or corresponding token sequences matched to specific links, areas, regions, etc. of the road network represented in the geographic database 109. The system 100 can then query for this real-time or historical data to provide a link-centric metric according to the various embodiments described herein.

In one embodiment, the other data records 1011 include cartographic ("carto") data records, routing data, and maneuver data, which can facilitate generating routing and/or navigation information for end user devices. In one embodiment, the indexes 1013 may improve the speed of data retrieval operations in the geographic database 1001. For example, the indexes 1013 may be used to quickly locate data without having to search every row in the geographic database 1001 every time it is accessed.

The geographic database 109 can be maintained by the content provider 119 in association with the services platform 117 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 109 can be a master geographic database stored in a format that facilitates updating, maintenance, and development. For example, the master geographic database 109 or data in the master geographic database 109 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 109 can be a master geographic database, but in alternate embodiments, the geographic database 109 can represent a compiled navigation database that can be used in or with end user devices (e.g., vehicle 101, UE 103, etc.) to provide navigation-related functions. For example, the geographic database 109 can be used with the end user device to provide an end user with navigation features. In such a case, the geographic database 109 can be downloaded or stored on the end user device (e.g., vehicle 101, UE 103, etc.), such as in application 111, or the end user device can access the geographic database 109 through a wireless or wired connection (such as via a server and/or the communication network 105), for example.

In one embodiment, the end user device can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device (e.g., UE 103) can be a cellular telephone. An end user can use the device navigation functions such as guidance and map display, for example, and for determination of route information to at least one identified point of interest ("POI"), according to exemplary embodiments.

The processes described herein for providing a localized link-centric metric for directional traffic propagation may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
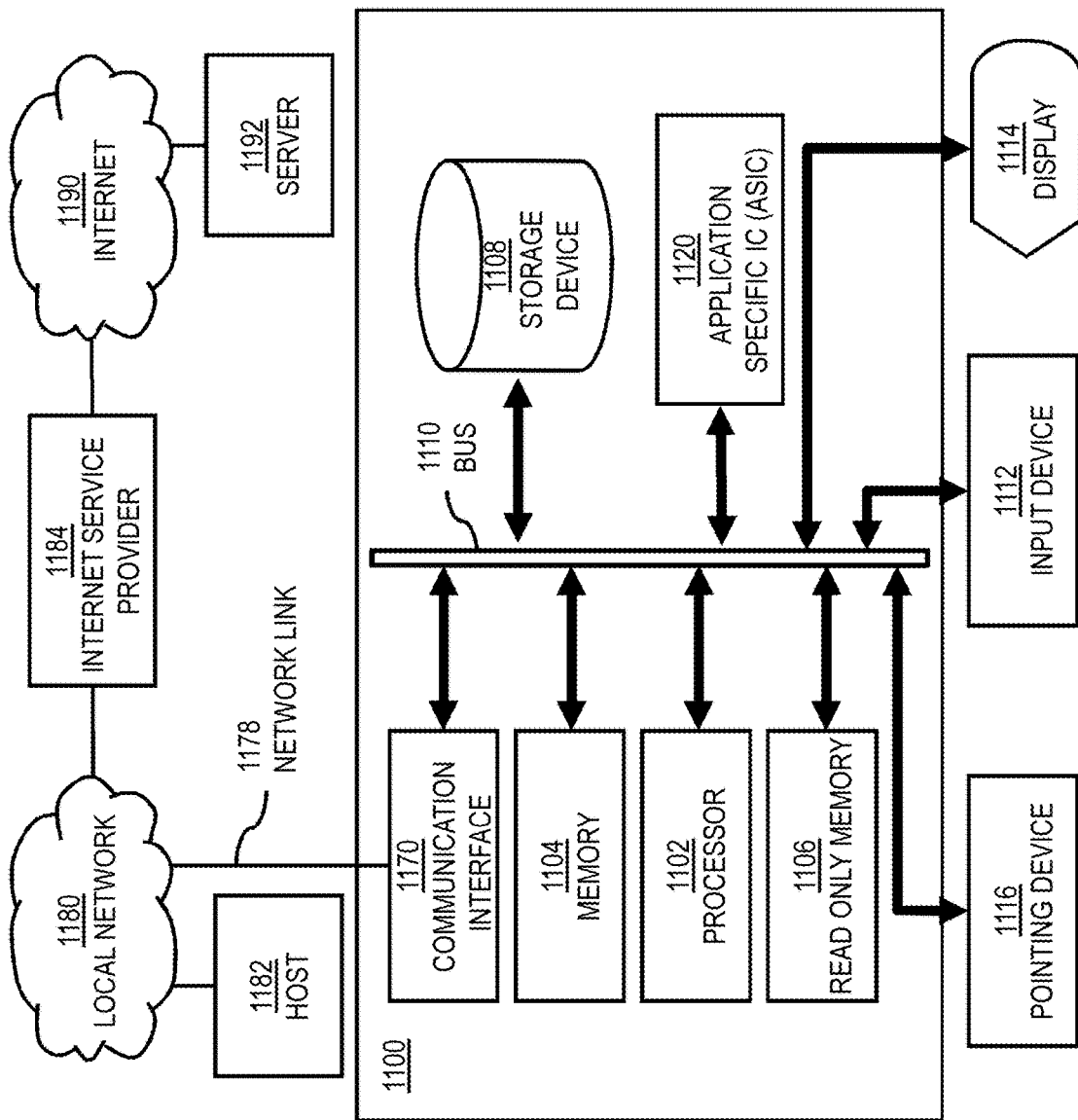
FIG. 11 is a diagram of hardware that can be used to implement the system and/or functions thereof, according to one embodiment.

FIG. 11 illustrates a computer system 1100 upon which an embodiment may be implemented. Computer system 1100 is programmed (e.g., via computer program code or instructions) to provide a localized link-centric metric for directional traffic propagation as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to provide a localized link-centric metric for directional traffic propagation. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for providing a localized link-centric metric for directional traffic propagation. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing a localized link-centric metric for directional traffic propagation, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 105 for providing a localized link-centric metric for directional traffic propagation The term computer-readable medium is used herein to refer to any medium that participates in providing information to processor 1102, including instructions for execution.

Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 12 illustrates a chip set 1200 upon which an embodiment may be implemented. Chip set 1200 is programmed to provide a localized link-centric metric for directional traffic propagation as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide a localized link-centric metric for directional traffic propagation. The memory 1205 also stores the data associated with or generated by the execution of the inventive steps.

Figure 13:
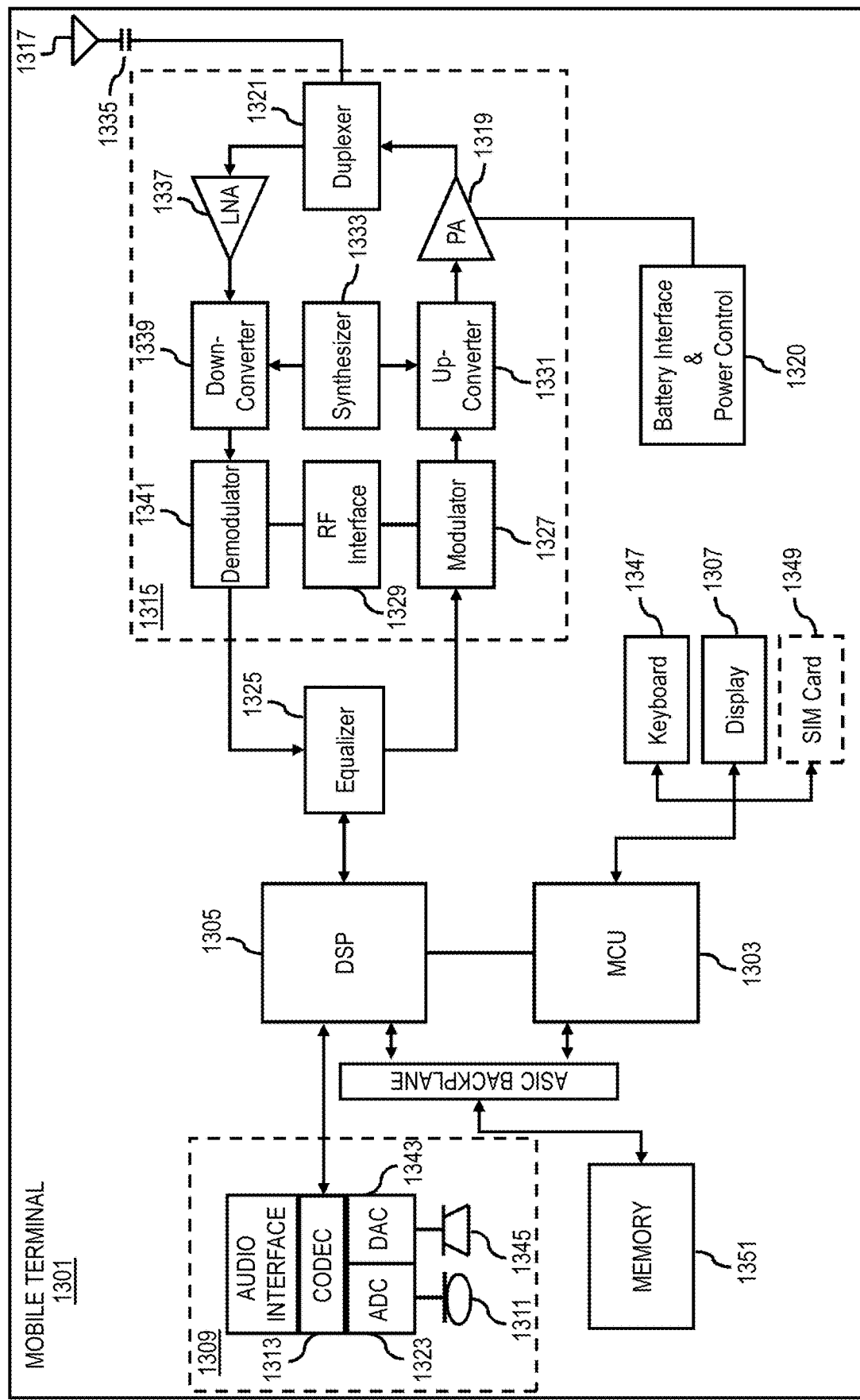
FIG. 13 is a diagram of a mobile terminal (e.g., handset or vehicle or part thereof) that can be used to implement an embodiment.

FIG. 13 is a diagram of exemplary components of a client terminal 1301 (like device 103 or vehicle 101 or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to provide a localized link-centric metric for directional traffic propagation. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
designating a base link of a road network;
retrieving a plurality of vehicle trajectories that pass through the base link, wherein the plurality of vehicle trajectories is based on probe data collected from one or more sensors of a plurality of vehicles travelling in the road network;
determining a frequency at which the plurality of vehicle trajectories passes through the base link to each of one or more other links in the plurality of vehicle trajectories within a proximity threshold;
computing, by a processor, a link-centric metric for said each of the one or more other links relative to the base link based on the determined frequency; and
modeling, by the processor, traffic in the road network using at least the link-centric metric.

2. The method of claim 1, wherein each of the plurality of vehicle trajectories is represented as a token sequence, and wherein each token in the token sequence is a tokenized representation of a plurality of links to which the plurality of vehicle trajectories is map-matched.

3. The method of claim 2, wherein the proximity threshold is based on a number of tokens from the base link within the token sequence.

4. The method of claim 1, wherein the link-centric metric includes an inflow metric that is computed based on an inflow portion of the plurality of vehicle trajectories flowing into the base link, and an outflow metric that is computed based on an outflow portion of the plurality of vehicle trajectories flowing from the base link.

5. The method of claim 1, further comprising:
measuring a proximity of said each of the one or more other links to the base link in each individual trajectory of the plurality of vehicle trajectories to determine a respective score for said each of the one or more other links based on a scoring function,
wherein the link-centric metric is further based on the respective score for said each of the one or more other links.

6. The method of claim 5, wherein the scoring function is based on a monotonic function.

7. The method of claim 1, further comprising:
determining a visual representation of the base link, the one or more other links, or a combination thereof based on the link-centric metric; and
presenting the visual representation in a mapping user interface depicting the road network.

8. The method of claim 7, further comprising:
determining a number of the one or more other links to present in the mapping user interface based on the link-centric metric; and at least one of:
generating real-time routing instructions, a time of arrival estimate, or a combination thereof based on the link-centric metric and the traffic modeled in the road network,
performing at least one correlation of the links based on the link-centric metric, the vehicle trajectories, and the traffic modeled in the road network,
predicting real-time traffic propagation within the road network based on the link-centric metric and the traffic modeled in the road network, and
detecting one or more topology changes in the road network based on the vehicle trajectories, the link-centric metric, and the traffic modeled in the road network without using an underlying topology of the road network.

9. The method of claim 8, further comprising:
determining a visual representation of the real-time routing instructions, the time of arrival estimate, the at least one correlation of the links, the real-tile traffic propagation, the one or more topology, or a combination thereof; and
presenting the visual representation in the mapping user interface.

10. The method of claim 1, further comprising:
removing each instance of duplicate consecutive links from the plurality of vehicle trajectories prior to the computing of the link-centric metric.

11. The method of claim 1, further comprising:
determining that an amount of the probe data does not meet a threshold value for one or more links of the road network;
selecting one or more other links of the road network that have the amount of the probe data that meets the threshold value based on the link-centric metric; and
extrapolating the probe data from the one or more other selected links to the one or more links.

12. An apparatus comprising:
at least one processor; and
at least one memory including computer program code for one or more programs,
the at least one memory and the computer program code configured to, with the at least one processor, cause the apparatus to perform at least the following,
compress a plurality of vehicle trajectories into a plurality of token sequences,
wherein each token of each of the plurality of token sequences represents a link of a road network;
designate a base link of the road network from among the plurality of token sequences;
compute a link-centric metric for one or more links represented in the plurality of token sequences relative to the base link based on a frequency at which the plurality of token sequences indicates that the plurality of vehicle trajectories passes through the base link to the one or more links; and
model traffic in the road network using at least the link-centric metric.

13. The apparatus of claim 12, wherein link information associated with said each token is obtained from a lookup table.

14. The apparatus of claim 12, wherein the compressing of the plurality of vehicle trajectories causes the apparatus to:
map-match the plurality of vehicle trajectories to a plurality of links of the road network;
determine a plurality of tokens corresponding to the plurality of links; and
concatenate the plurality of tokens to generate the plurality of token sequences to represent a sequence of the plurality of links occurring in the plurality of vehicle trajectories.

15. The apparatus of claim 12, wherein the apparatus is further caused to:
for said each of the plurality of token sequences, designate one or more tokens occurring before the base link as one or more inflow tokens; and
calculate an inflow metric of the link-centric metric based on the one or more inflow tokens.

16. The apparatus of claim 12, wherein the apparatus is further caused to:
for said each of the plurality of token sequences, designate one or more tokens occurring after the base link as one or more outflow tokens; and
calculate an outflow metric of the link-centric metric based on the one or more outflow tokens.

17. The apparatus of claim 12, wherein the link of the road network corresponds to a link record, a node record, or a combination thereof of a geographic database.

18. A non-transitory computer-readable storage medium, carrying one or more sequences of one or more instructions which, when executed by one or more processors, cause an apparatus to at least perform the following steps:
generating a plurality of token sequences to respectively represent a plurality of probe trajectories, wherein a plurality of tokens in the plurality of token sequences respectively represents a plurality of trajectory segments in the plurality of probe trajectories;
designating a base token from among said each token of the plurality of token sequences;
compute a link-centric metric relative to the base token based on a frequency at which the plurality of token sequences indicates that the plurality of probe trajectories passes through a base trajectory segment represented by the base token to one or more other trajectory segments represented by one or more other tokens of the plurality of token sequences;
map-matching the trajectory segments to respective road links in a road network; and modeling traffic in the road network using at least the link-centric metric.

19. The non-transitory computer-readable storage medium of claim 18, wherein the plurality of probe trajectories is determined from at least one sensor mounted on one or more probe devices.

20. The non-transitory computer-readable storage medium of claim 18, wherein the apparatus is further caused to perform:
measuring a proximity of said each of the one or more other tokens to the base token in each individual trajectory of the plurality of probe trajectories to determine a respective score for said each of the one or more other tokens based on a scoring function,
wherein the link-centric metric is further based on the respective score for said each of the one or more other tokens.

* * * * *